(12) United States Patent
Ishikawa et al.

(10) Patent No.: US 11,218,672 B2
(45) Date of Patent: Jan. 4, 2022

(54) DISPLAY DEVICE

(71) Applicant: Japan Display Inc., Tokyo (JP)

(72) Inventors: Tomokazu Ishikawa, Tokyo (JP); Hitomi Hasegawa, Tokyo (JP); Masaru Nakakomi, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 16/950,935

(22) Filed: Nov. 18, 2020

(65) Prior Publication Data

US 2021/0076011 A1 Mar. 11, 2021

Related U.S. Application Data

(63) Continuation of application No. 16/427,367, filed on May 31, 2019, now Pat. No. 10,863,151.

(30) Foreign Application Priority Data

Jun. 5, 2018 (JP) .............................. JP2018-107852

(51) Int. Cl.
| | |
|---|---|
| *G02F 1/1337* | (2006.01) |
| *H04N 9/31* | (2006.01) |
| *G02F 1/1362* | (2006.01) |
| *G02F 1/1333* | (2006.01) |

(52) U.S. Cl.
CPC ..... *H04N 9/3141* (2013.01); *G02F 1/133345* (2013.01); *G02F 1/133711* (2013.01); *G02F 1/136286* (2013.01)

(58) Field of Classification Search
None
See application file for complete search history.

(56) References Cited

U.S. PATENT DOCUMENTS

| | | | |
|---|---|---|---|
| 2011/0109866 A1 | 5/2011 | Ko et al. | |
| 2015/0131041 A1* | 5/2015 | Moriwaki | G02F 1/133345 349/106 |
| 2015/0346556 A1 | 12/2015 | Hirota et al. | |
| 2016/0029502 A1 | 1/2016 | Lee et al. | |
| 2018/0070461 A1* | 3/2018 | Lee | H05K 5/0017 |

FOREIGN PATENT DOCUMENTS

JP 2015-225227 A 12/2015

* cited by examiner

*Primary Examiner* — James A Dudek
(74) *Attorney, Agent, or Firm* — Xsensus LLP

(57) ABSTRACT

According to one embodiment, a display device including a first substrate including an organic film, a first recess and a second recess formed in the organic film, and a first projection having the organic film, a second substrate, and a sealing member located in a second area around a first area, and bonding the first substrate and the second substrate together, wherein the first substrate includes a mounting portion, the first recess and the second recess extend in the second area, a first leading end portion of the first recess is separated from a second leading end portion of the second recess, and the first projection, the first recess and the second recess overlap the sealing member.

11 Claims, 24 Drawing Sheets

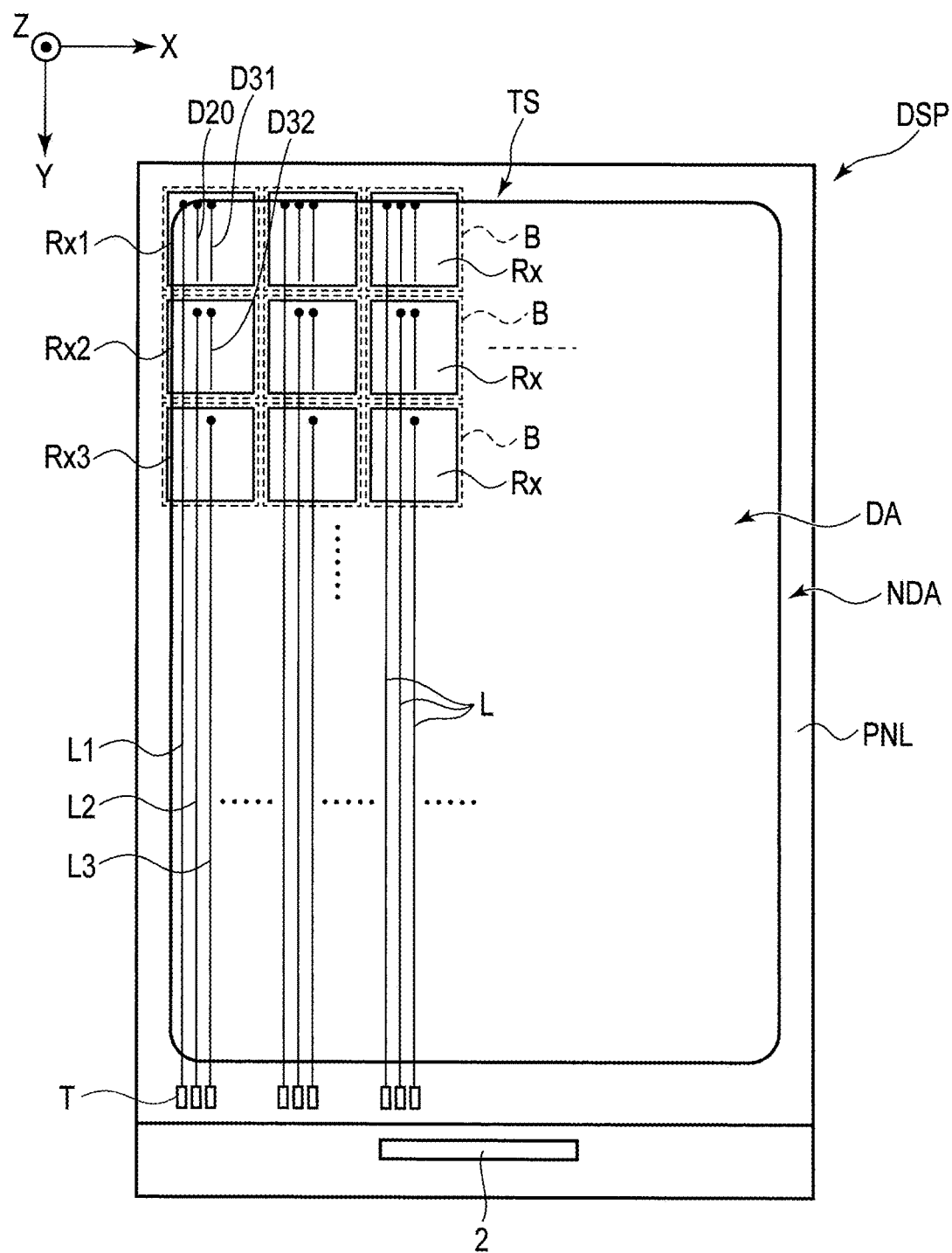
F I G. 4

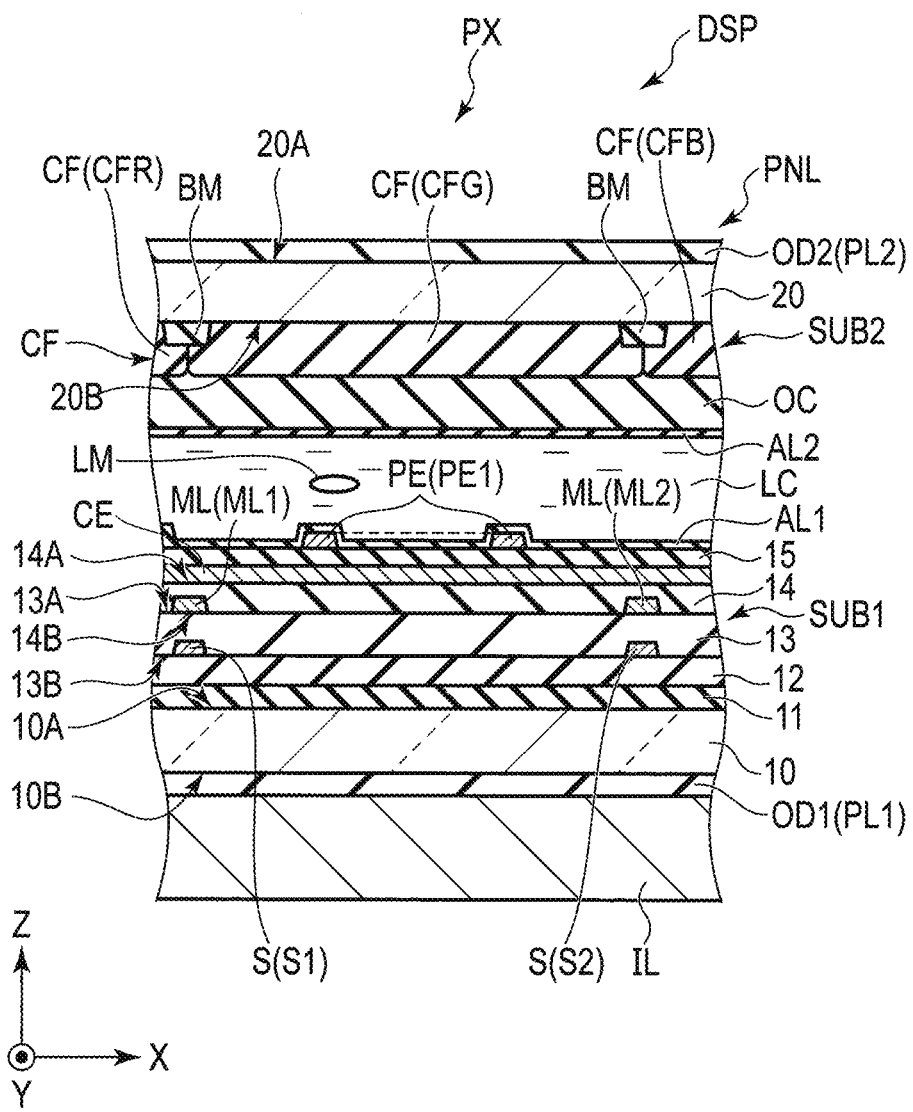
F I G. 7

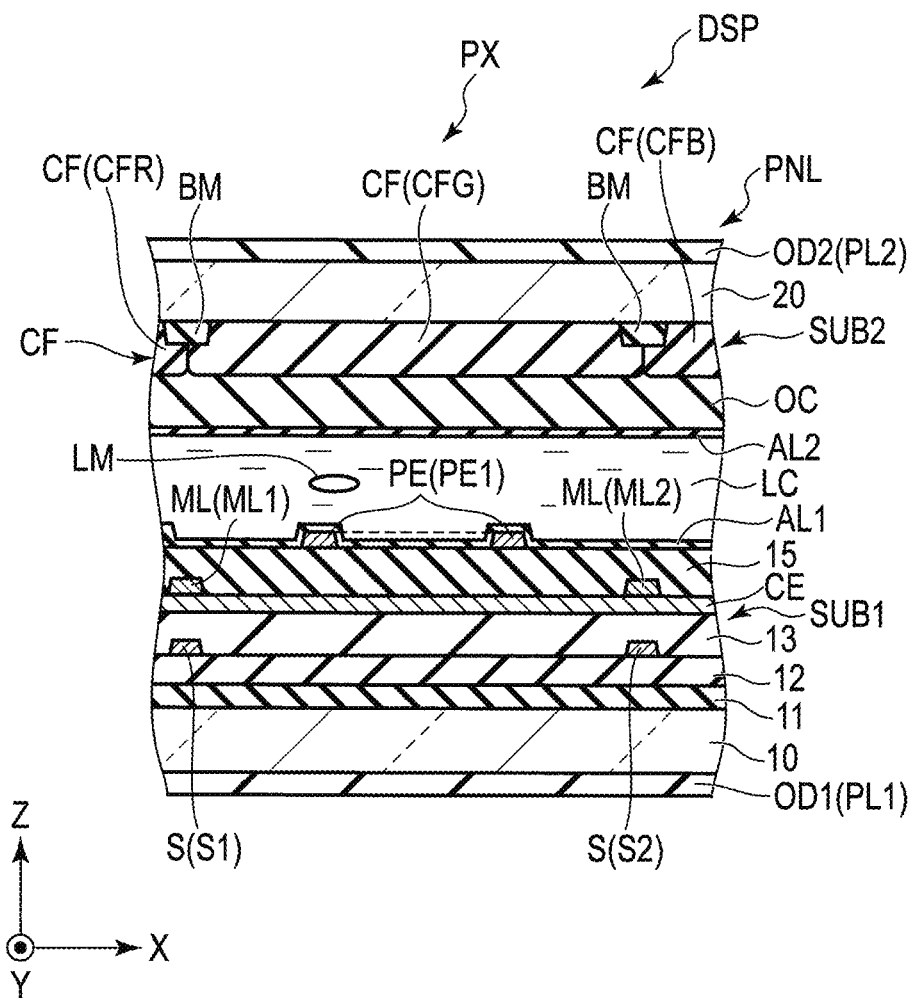
F I G. 23

DISPLAY DEVICE

CROSS-REFERENCE TO RELATED APPLICATIONS

The present application is a continuation of U.S. application Ser. No. 16/427,367, filed May 31, 2019, and claims the benefit of priority from Japanese Patent Application No. 2018-107852, filed Jun. 5, 2018, the entire contents of each are incorporated herein by reference.

FIELD

Embodiments described herein relate generally to a display device.

BACKGROUND

Recently, display devices of various forms have been proposed. A display device has a display panel composed of a plurality of layers. If an impact, etc., is applied to the display panel, layers having low adhesion strength among the layers constituting the display panel may be detached in some cases.

BRIEF DESCRIPTION OF THE DRAWINGS

FIG. 4 is a plan view showing a configuration example of a touch sensor of the first embodiment.

FIG. 7 is a cross-sectional view showing a configuration example of a part of the display panel shown in FIGS. 1 to 3.

FIG. 23 is a cross-sectional view showing the structure of a part of a display panel of the second embodiment.

DETAILED DESCRIPTION

Figure 1:
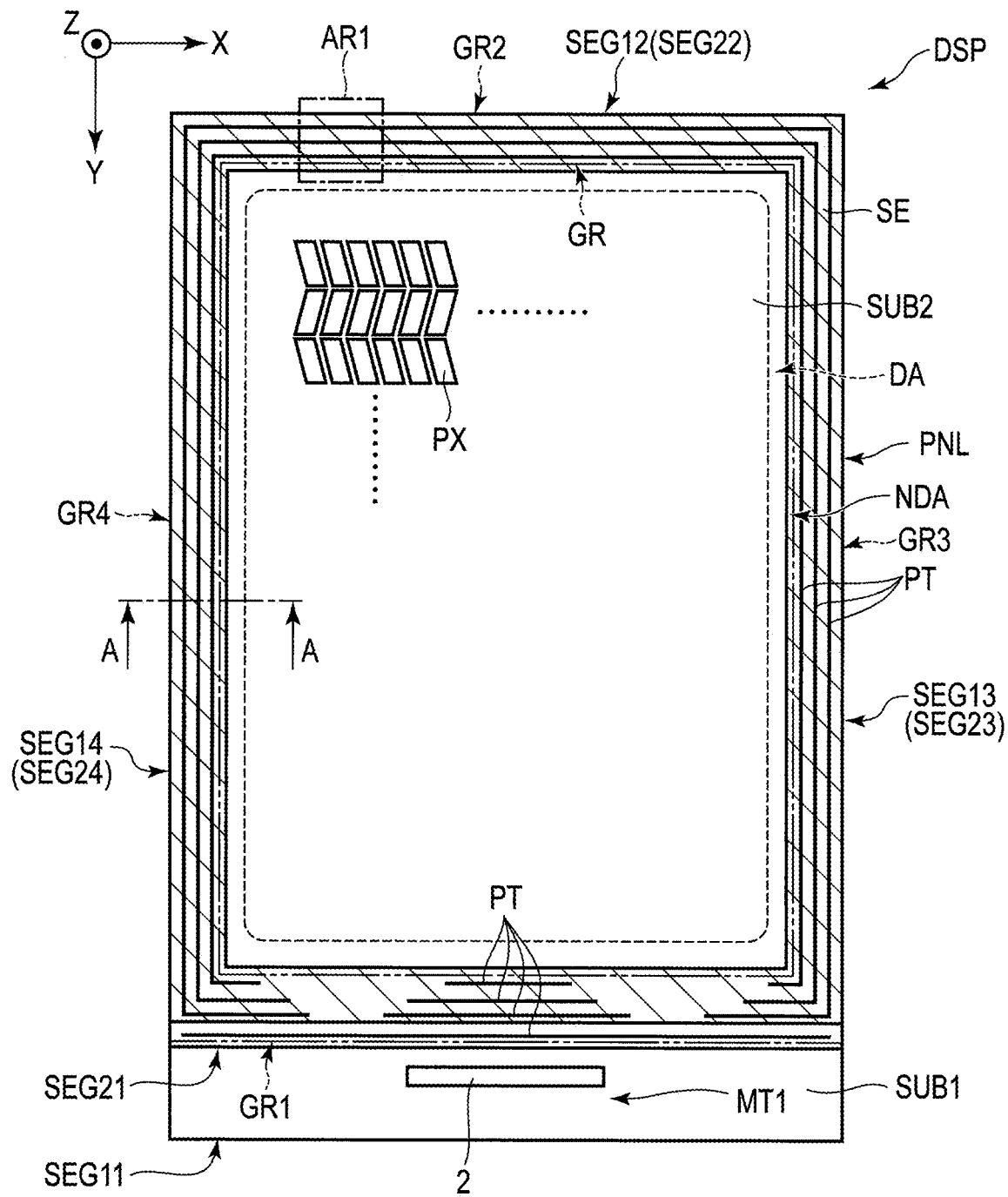
FIG. 1 is a plan view showing an example of the external appearance of a display device of the first embodiment.

In general, according to one embodiment, a display device comprises: a first substrate comprising an organic film, a first recess formed in the organic film, a second recess arranged along with the first recess and formed in the organic film, and a first projection located between the first recess and the second recess and having the organic film; a second substrate opposed to the first substrate; and a sealing member located in a second area around a first area in which an image is displayed, and bonding the first substrate and the second substrate together, wherein the first substrate comprises a mounting portion extending on an outside of the second substrate, the first recess and the second recess extend in a first direction in the second area on a mounting portion side in planar view, a first leading end portion of the first recess is separated from a second leading end portion of the second recess in the first direction, and the first projection, the first recess and the second recess overlap the sealing member.

According to another embodiment, a display device comprises: a first substrate comprising an organic film, a first recess formed in the organic film, and a second recess arranged along with the first recess and formed in the organic film; a second substrate opposed to the first substrate; and a sealing member located in a second area around a first area in which an image is displayed, and bonding the first substrate and the second substrate together, wherein the first substrate comprises a mounting portion extending on an outside of the second substrate, the first recess and the second recess are arranged stepwise in the second area on a mounting portion side in planar view, and the sealing member is superposed from the first recess to the second recess.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

Display devices DSP according to the embodiments will be described below. As one example, the display devices DSP in the embodiments are assumed to be liquid crystal display devices.

Firstly, an example of the external appearance of the display device DSP according to the first embodiment will be described with reference to FIGS. 1 to 3. Note that the external appearance of the display device DSP according to the first embodiment is not limited to the external appearance shown in FIGS. 1 to 3.

FIG. 1 is a plan view showing an example of the external appearance of the display device DSP of the first embodiment. A first direction X, a second direction Y and a third direction Z orthogonally cross each other in the drawing but may cross at an angle other than 90 degrees. Each of the first direction X and the second direction Y corresponds to a direction in which one side of a surface of a substrate constituting the display device DSP extends, and the third direction Z corresponds to a thickness direction of the display device DSP. In the specification, a direction toward the pointing end of an arrow indicating the third direction Z will be referred to as an upward direction (or simply above) and a direction toward the opposite side from the pointing end of the arrow will be referred to as a downward direction (or simply below). When described as "a second member above a first member" or "a second member below a first member", the second member may be in contact with the first member or may be separated from the first member.

In addition, an observation position at which the display device DSP is observed is assumed to be located on the pointing end side of the arrow indicating the third direction Z, and a view from this observation position toward an X-Y plane defined by the first direction X and the second direction Y will be referred to as planar view. A length in each of the first direction X and the second direction Y may be referred to as a width, a length in the second direction Y may be referred to as a vertical width, and a length in the third direction Z may be referred to as a thickness in the following descriptions.

The display device DSP comprises a display panel PNL and an IC chip 2.

In the example shown in FIG. 1, the display panel PNL is formed in a substantially rectangular shape in planar view. The display panel PNL comprises a first substrate SUB1, a second substrate SUB2 opposed to the first substrate SUB1, a sealing member SE, and a display function layer (in the present embodiment, a liquid crystal layer LC which will be described later) held between the first substrate SUB1 and the second substrate SUB2. The first substrate SUB1 and the second substrate SUB2 are bonded together by the sealing member SE while a predetermined gap is being formed between them. A space formed between the first substrate SUB1 and the second substrate SUB and surrounded by the sealing member SE is filled with the liquid crystal layer LC. The display panel PNL has a display area DA which displays an image on the inside surrounded by the sealing member SE, and a frame-shaped non-display area NDA which surrounds the display area DA. The sealing member SE is located in the non-display area NDA. In FIG. 1, the sealing member SE is indicated by diagonal lines slanting upward to the left. In the example shown in FIG. 1, the sealing member SE has a rectangular frame shape. In addition, the display area DA has such a round shape that corners are rounded. Note that the sealing member SE may have a shape other than a rectangular frame shape.

Furthermore, the display area DA may have a substantially rectangular shape or may have a polygonal shape other than a rectangular shape.

The display panel PNL comprises a plurality of sub-pixels PX in the display area DA. The term sub-pixel here indicates a minimum unit which can be individually controlled in accordance with a pixel signal, and exists in, for example, an area including a switching element disposed at a position at which a scanning line G and a signal line S which will be described later cross each other. In addition, a main pixel is composed of a plurality of sub-pixels. For example, one main pixel is composed of a sub-pixel corresponding to red, a sub-pixel corresponding to green and a sub-pixel corresponding to blue. In another example, one main pixel is composed of a sub-pixel corresponding to red, a sub-pixel corresponding to green, a sub-pixel corresponding to blue and a sub-pixel corresponding to white. The main pixel corresponds to a minimum unit of an image displayed in the display area DA. The sub-pixels PX are arranged in a matrix in the display area DA.

A signal supply source necessary for driving the display panel PNL such as the IC chip 2 is located in the non-display area NDA. In the example shown in FIG. 1, the IC chip 2 is mounted on a mounting portion MT1 of the first substrate SUB1 which extends on the outside of one substrate side edge (or may be referred to as substrate end portion) SEG21 of the second substrate SUB2. In other words, the IC chip 2 overlaps the mounting portion MT1. Note that the IC chip 2 is not necessarily mounted on the mounting portion MT1 and may be provided on a flexible printed circuit (FPC) board connected to the mounting portion MT1. The mounting portion MT1 is formed along one substrate side edge SEG11 of the first substrate SUB1. Although not illustrated in the drawing, the first substrate SUB1 comprises a connecting terminal (hereinafter referred to as a pad) for connecting the signal supply source to the mounting portion MT1. The pad includes those which are electrically connected to a scanning line G, a signal line S and the like which will be described later. Note that, in the example shown in FIG. 1, other three substrate side edges SEG22, SEG23 and SEG24 of the second substrate SUB2 are opposed to other three substrate side edges SEG12, SEG13 and SEG14 of the first substrate SUB1, respectively. The IC chip 2 has a built-in display driver which outputs a signal necessary for image display in a display mode of displaying an image. In addition, the IC chip 2 has a built-in touch controller which controls a touch sensing mode of detecting approach or contact of an object to the display device DSP. Note that the touch controller may be incorporated in an IC chip other than the IC chip 2.

The display panel PNL has a groove GP in the first substrate SUB1. The groove GR is located in the non-display area NDA. In the example shown in FIG. 1, the groove GR overlaps the sealing member SE. The groove GR is formed in a rectangular frame shape along the substrate side edges SEG21 to SEG24 of the second substrate SUB2. The groove GR has a groove GR1 located on the substrate side edge SEG11 (SEG21) side, a groove GR2 located on the substrate side edge SEG12 (SEG22) side, a groove GR3 located on the substrate side edge SEG13 (SEG23) side and a groove GR4 located on the substrate side edge SEG14 (SEG24) side.

The display panel PNL comprises a projection PT in the first substrate SUB1. The projection PT is located in the non-display area NDA. The projection PT overlaps, for example, the sealing member SE and the groove GR. In the example shown in FIG. 1, the projection PT is arranged around the display area DA along the sealing member SE. While some projections PT are arranged over the entire circumference of the display area DA, other projections PT are disconnected on the mounting portion MT1 side. In addition, some projections PT are located only on the mounting portion MT1 side. Note that all projections PT may be arranged over the entire circumference of the display area DA. Alternatively, all projections PT may be discontinuously arranged around the display area DA.

The display panel PNL may be any one of a transmissive display panel having a transmissive display function of displaying an image by selectively transmitting light from a rear surface side of the first substrate SUB1, a reflective display panel having a reflective display function of displaying an image by selectively reflecting light from a front surface side of the second substrate SUB2, and a transflective display panel having the transmissive display function and the reflective display function.

In addition, although the detailed configuration of the display panel PNL will not be described here, the display panel PNL may have a configuration corresponding to any one of a display mode using a lateral electric field along a surface of a substrate parallel to the X-Y plane, a display mode using a longitudinal electric field along a normal to a surface of a substrate, a display mode using an inclined electric field which is inclined obliquely with respect to a surface of a substrate, and a display mode using an appropriate combination of the lateral electric field, the longitudinal electric field and the inclined electric field described above.

Figure 2:
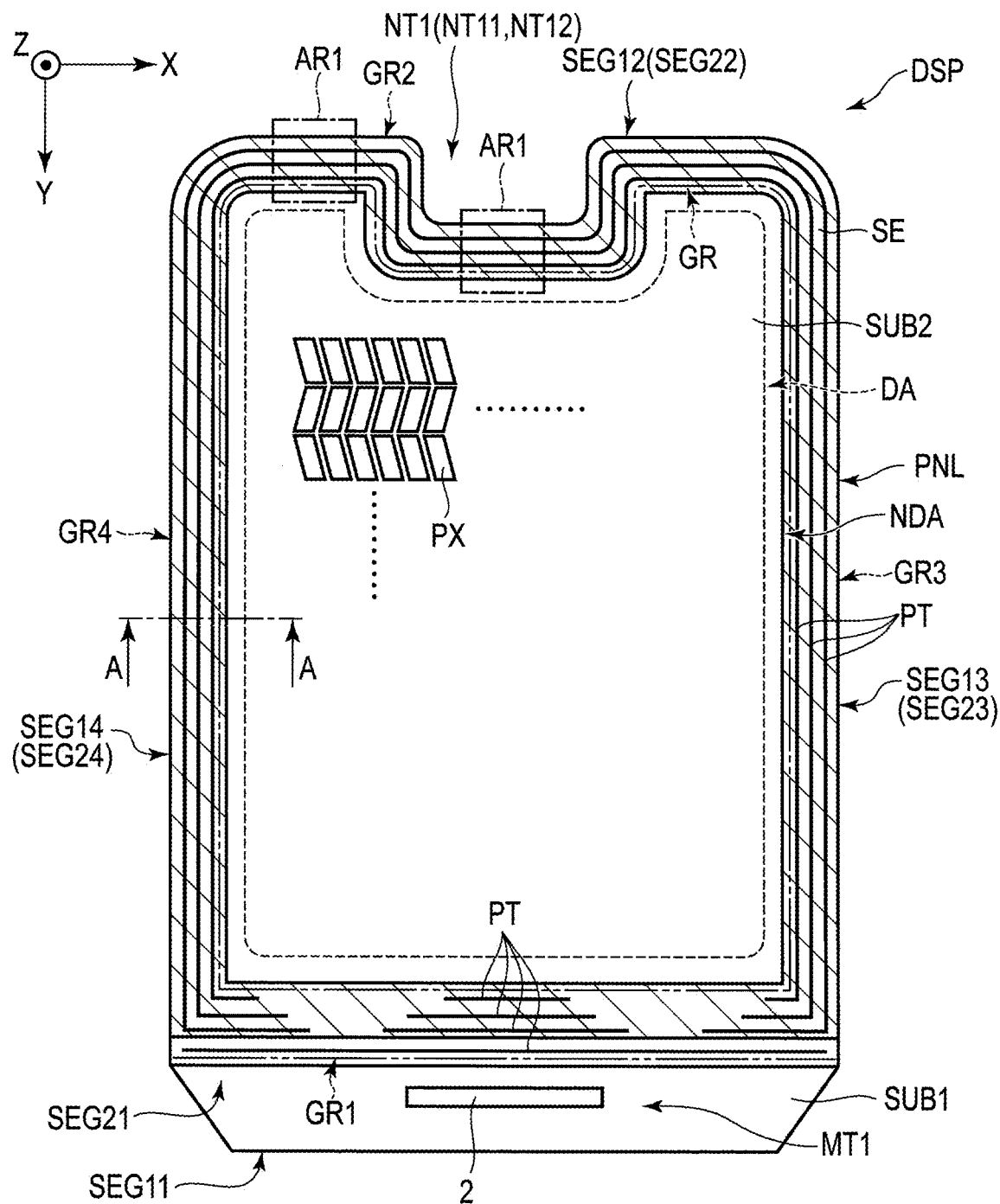
FIG. 2 is a plan view showing an example of the external appearance of the display device of the first embodiment.

FIG. 2 is a plan view showing an example of the external appearance of the display device DSP of the first embodiment. In the example shown in FIG. 2, the display panel PNL is formed in a substantially round shape in planar view. The display panel PNL has a notch NT1. The notch NT1 includes a notch NT11 formed in the first substrate SUB1 and a notch NT12 formed in the second substrate SUB2. The notch NT11 overlaps the notch NT12. The notch NT11 is located on the substrate side edge SEG12 side on the opposite side from the substrate side edge SEG11 and is recessed toward the substrate side edge SEG11 side in the second direction Y. The notch NT12 is located on the substrate side edge SEG22 side on the opposite side from the substrate side edge SEG21 and is recessed toward the substrate side edge SEG11 side in the second direction Y. The display area DA is formed in such a substantially round shape that the display area DA is recessed toward the substrate side edge SEG11 (SEG21) side along the notch NT1. The sealing member SE is arranged around the display area DA in accordance with the shape of the display area DA. The sealing member SE is bent on the substrate side edge SEG12 (SEG22) side along the notch NT1. The projection PT is arranged around the display area DA along the sealing member SE. The projection PT is bent on the substrate side edge SEG12 (SEG22) side along the sealing member SE.

Figure 3:
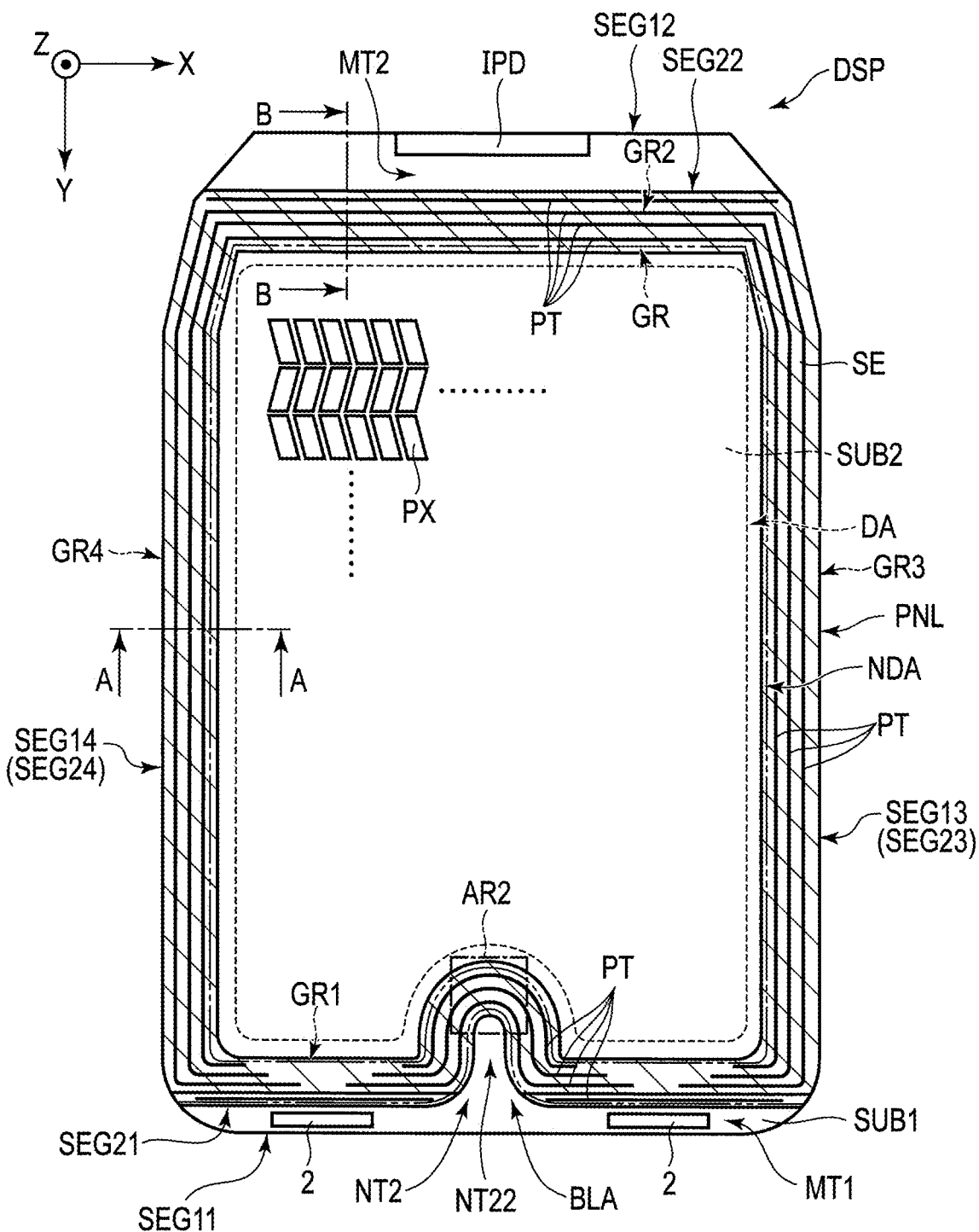
FIG. 3 is a plan view showing an example of the external appearance of the display device of the first embodiment.

FIG. 3 is a plan view showing an example of the external appearance of the display device DSP of the first embodiment. In the example shown in FIG. 3, the display panel PNL is formed in a substantially round shape in planar view. The display panel PNL has a notch NT2. The notch NT2 includes an area BLA of the mounting portion MT1 and a notch NT22 formed in the second substrate SUB2. The area BLA overlaps the notch NT22. The notch NT22 is located on the substrate side edge SEG21 side of the second substrate SUB2 and is recessed toward the substrate side edge SEG22 side. The IC chip 2 is connected to two areas of the mounting portion MT1 which are located on both sides in the first direction X of the area BLA which overlaps the notch NT22 in the mounting portion MT1. In other words, two IC chips 2 are connected to areas of the mounting portion MT1 other than the area BLA. Note that the IC chip 2 may be connected to one area of the mounting portion MT1 other than the area BLA. The display area DA is formed in such a substantially round shape that the display area DA is recessed toward the substrate side edge SEG12 (SEG22) side along the notch NT22. The sealing member SE is arranged around the display area DA in accordance with the shape of the display area DA. The sealing member SE is bent on the substrate side edge SEG11 (SEG21) along the notch NT22. The projection PT is arranged around the display area DA along the sealing member SE. The projection PT is bent on the substrate side edge SEG11 (SEG21) side along the sealing member SE.

In the example shown in FIG. 3, the display panel PNL comprises a pad IPD for checking continuity of a wiring line, etc. The pad IPD is located in the non-display area NDA and is mounted on a mounting portion MT2 of the first substrate SUB1 which extends on the outside of the substrate side edge SEG22 of the second substrate SUB2. The mounting portion MT2 is located on the opposite side from the mounting portion MT1 in the second direction Y. The mounting portion MT2 is formed along the substrate side edge SEG12 of the first substrate SUB1.

FIG. 4 is a plan view showing a configuration example of a touch sensor TS. A self-capacitive touch sensor TS will be described here, but the touch sensor TS may be a mutual-capacitive touch sensor.

The touch sensor TS comprises a plurality of sensor electrodes (detection electrodes) Rx (Rx1, Rx2 . . . ) arranged in a matrix and a plurality of sensor wiring lines L (L1, L2 . . . ). The sensor electrodes Rx are located in the display area DA and are arranged in a matrix in the first direction X and the second direction Y. One sensor electrode Rx constitutes one sensor block B. The sensor block B is a minimum unit which can perform touch sensing. The sensor wiring lines L extend in the second direction Y and are arranged in the first direction X in the display area DA. Each sensor wiring line L is provided at, for example, a position overlapping a signal line S which will be described later. In addition, each sensor wiring line L is drawn to the non-display area NDA and is electrically connected to the IC chip 2 or another external circuit such as an FPC board. Each sensor wiring line L has a terminal T in the non-display area NDA.

Here, attention will be focused on the relationship between the sensor wiring lines L1 to L3 arranged in the first direction X and the sensor electrodes Rx1 to Rx3 arranged in the second direction Y. The sensor wiring line L1 overlaps the sensor electrodes Rx1 to Rx3 and is electrically connected to the sensor electrode Rx1.

The sensor wiring line L2 overlaps the sensor electrodes Rx2 and Rx3 and is electrically connected to the sensor electrode Rx2. A dummy wiring line D20 is separated from the sensor wiring line L2. The dummy wiring line D20 overlaps the sensor electrode Rx1 and is electrically connected to the sensor electrode Rx1. The sensor wiring line L2 and the dummy wiring line D20 are located on the same signal line.

The sensor wiring line L3 overlaps the sensor electrode Rx3 and is electrically connected to the sensor electrode Rx3. A dummy wiring line D31 overlaps the sensor electrode Rx1 and is electrically connected to the sensor electrode Rx1. A dummy wiring line D32 is separated from the dummy wiring line D31 and the sensor wiring line L3. The dummy wiring line D32 overlaps the sensor electrode Rx2 and is electrically connected to the sensor electrode Rx2. The sensor wiring line L3 and the dummy wiring lines D31 and D32 are located on the same signal line.

In the touch sensing mode, the IC chip 2, for example, the touch controller incorporated in the IC chip 2 applies a touch drive voltage to the sensor wiring lines L. Consequently, the touch drive voltage is applied to the sensor electrodes Rx and sensing in the sensor electrodes Rx is performed. Sensor signals corresponding to the sensing results in the sensor electrodes Rx are output to the IC chip 2 (touch controller) via the sensor wiring lines L. The IC chip 2 (touch controller) or an external host detects the presence or absence of approach or contact of an object to the display device DSP and the position coordinates of the object based on the sensing signals.

Note that the sensor electrodes Rx in the display mode function as common electrodes CE to which a common voltage (Vcom) is applied. The common voltage is applied from the IC chip 2, for example, a voltage supply unit included in the display driver incorporated in the IC chip 2 via the sensor wiring lines L.

Figure 5:
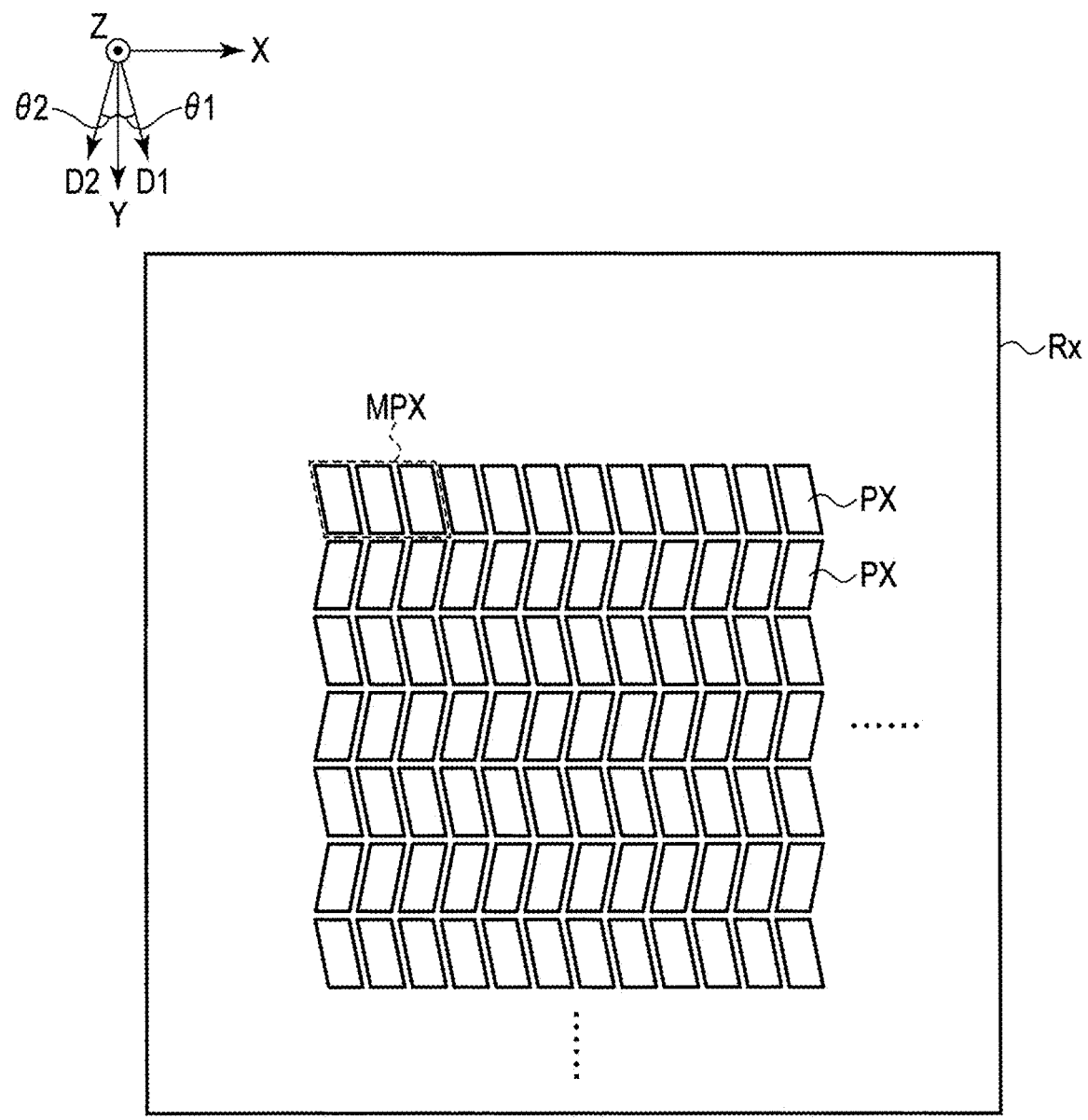
FIG. 5 is a plan view showing an example of a sensor electrode and a sub-pixel shown in FIG. 4.

FIG. 5 is a plan view showing the sensor electrode Rx shown in FIG. 4 and the sub-pixel PX. In FIG. 5, a direction crossing the second direction Y counterclockwise at an acute angle is defined as a direction D1 and a direction crossing the second direction Y clockwise at an acute angle is defined as a direction D2. Note that an angle 81 formed between the second direction Y and the direction D1 is substantially the same as an angle 82 formed between the second direction Y and the direction D2.

One sensor electrode Rx is disposed over a plurality of sub-pixels PX. In the example illustrated, sub-pixels PX located in the odd-numbered rows in the second direction Y extend in the direction D1. In addition, sub-pixels PX located in the even-numbered rows in the second direction Y extend in the direction D2. In one example, 60 to 70 main pixels MPX are disposed in the first direction X and 60 to 70 main pixels MPX are disposed in the second direction Y in one sensor electrode Rx. Note that the sub-pixels PX may not be arrayed as shown in FIG. 5.

Figure 6:
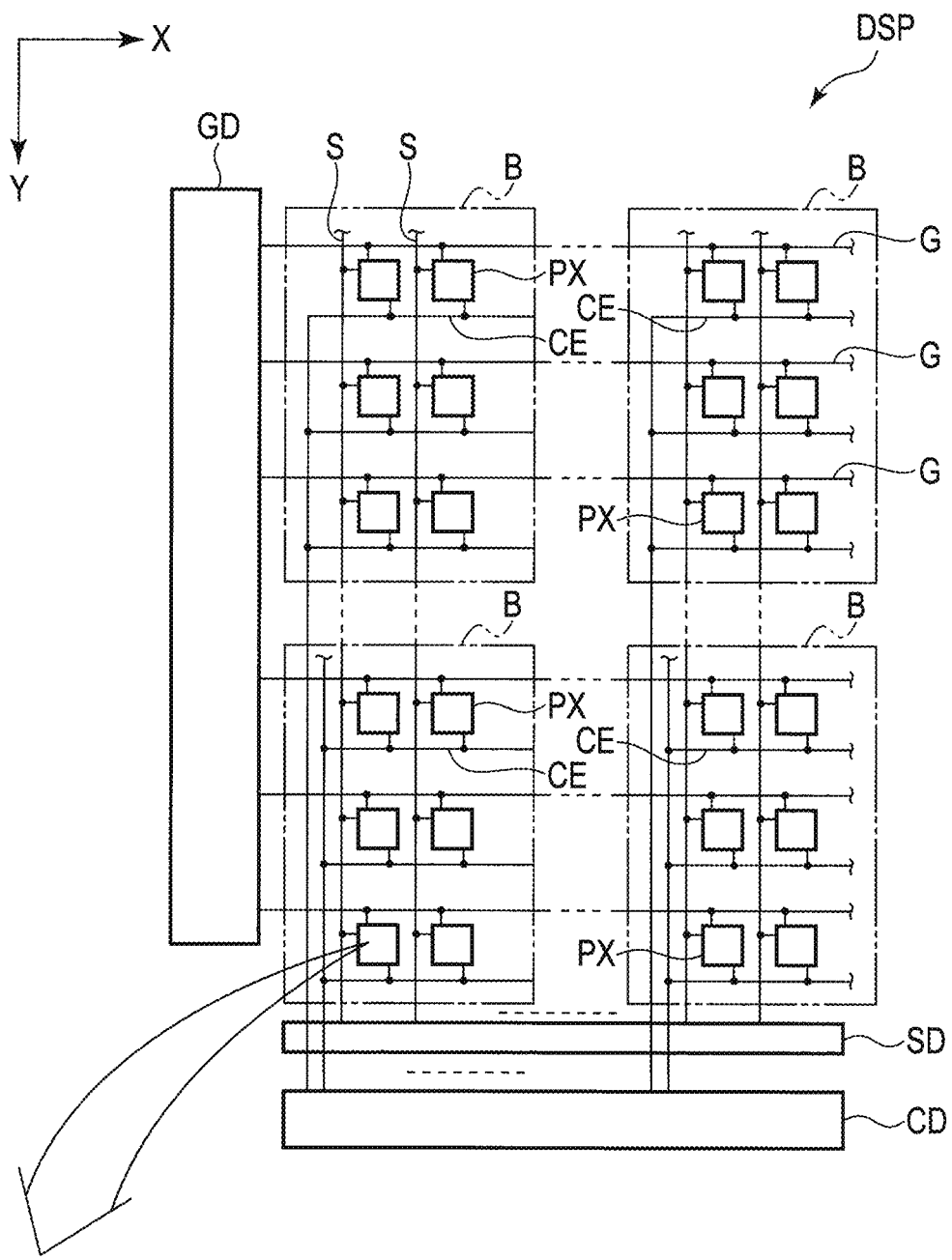
FIG. 6 is an illustration showing the basic configuration and equivalent circuit of the sub-pixel.
Figure 6:
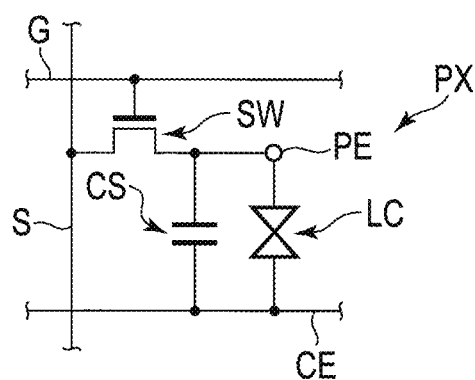

FIG. 6 is an illustration showing the basic configuration and equivalent circuit of the sub-pixel PX.

A plurality of scanning lines G are connected to a scanning line drive circuit GD. A plurality of signal lines S are connected to a signal line drive circuit SD. Each of the scanning line G and the signal line S is formed of a metal material such as aluminum (Al), titanium (Ti), silver (Ag), molybdenum (Mo), tungsten (W), copper (Cu) or chromium (Cr) or an alloy of these metal materials. Each of the scanning line G and the signal line S may have a single-layer structure or may have a multilayer structure. The scanning line G in one example is formed of, for example, molybdenum (Mo) tungsten (W) alloy. Furthermore, the signal line S in one example is formed of layers of titanium (Ti), aluminum (Al) and titanium (Ti) which are stacked in this order. Note that the scanning line G and the signal line S do not necessarily extend linearly and parts of the scanning line G and the signal line S may be bent. For example, even if a part of the signal line S is bent, it is still assumed that the signal line S extends in the second direction Y.

The common electrode CE is provided for each sensor block B. The common electrode CE is connected to a voltage supply unit CD of a common voltage (Vcom) and is disposed over a plurality of sub-pixels PX. The common electrode CE is a transparent electrode formed of a transparent conductive material such as indium tin oxide (ITO) or indium zinc oxide (IZO). In addition, each common electrode CE is also connected to the IC chip 2, for example, the touch controller incorporated in the IC chip 2 as described above and forms the sensor electrode Rx to which the touch drive voltage is applied in the touch sensing mode.

Each sub-pixel PX comprises a switching element SW, a pixel electrode PE, a common electrode CE, a liquid crystal layer LC and the like. The switching element SW is composed of, for example, a thin-film transistor (TFT) and is electrically connected to the scanning line G and the signal line S. The scanning line G is connected to the switching elements SW in the respective sub-pixels PX arranged in the first direction X. The signal line S is connected to the switching elements SW in the respective sub-pixels PX arranged in the second direction Y. The pixel electrode PE is electrically connected to the switching element SW. The pixel electrode PE is a transparent electrode formed of a transparent conductive material such as ITO or IZO. Each pixel electrode PE is opposed to the common electrode CE and drives the liquid crystal layer LC by an electric field which is produced between the pixel electrode PE and the common electrode CE. A storage capacitance CS is formed between, for example, an electrode at the same potential as the common electrode CE and an electrode at the same potential as the pixel electrode PE.

FIG. 7 is a cross-sectional view showing the structure of a part of the display panel PNL shown in FIGS. 1 to 3. FIG. 7 shows the structure of, for example, an area corresponding to the sub-pixel PX. The example shown in FIG. 7 corresponds to an example employing the display mode using the lateral electric field.

The first substrate SUB1 comprises an insulating substrate 10, an insulating layer 11, an insulating layer 12, an insulating layer 13, an insulating layer 14, an insulating layer 15, a signal line S (S1, S2, . . . ), a metal wiring line ML (ML1, ML2, . . . ), a common electrode CE, an alignment film AL1 and the like.

The insulating substrate 10 is a light transmissive substrate such as a glass substrate or a flexible resin substrate. The insulating substrate 10 has an upper surface 10A and a lower surface 10A on the opposite side from the upper surface 10A. The insulating layer 11 is located on the insulating substrate 10. The insulating layer 12 is located on the insulating layer 11. The signal line S is located on the insulating layer 12. In the example shown in FIG. 7, the signal line S1 and the signal line S2 are separated from each other in the first direction X. The insulating layer 13 has an upper surface 13A and a lower surface 13B on the opposite side from the upper surface 13A. The insulating layer 13 is located on the insulating layer 12 and covers the signal line S. The metal wiring line ML is located on the insulating layer 13. The metal wiring line ML is formed of a metal material such as aluminum (Al), titanium (Ti), silver (Ag), molybdenum (Mo), tungsten (W), copper (Cu) or chromium (Cr), an alloy of these metal materials or the like. The metal wiring line ML may have a single-layer structure or may have a multilayer structure. In one example, the metal wiring line ML is formed of layers of titanium (Ti), aluminum (Al)

and titanium (Ti) which are stacked in this order. The metal wiring line ML also functions as, for example, the sensor wiring line L which is electrically connected to the sensor electrode Rx. When functioning as the sensor wiring line L, the metal wiring line ML is electrically connected to the sensor electrode Rx, for example, the common electrode CE. In the example shown in FIG. 7, the metal wiring lines ML1 and ML2 are located directly above the signal lines S1 and S2, respectively. The insulating layer 14 has an upper surface 14A and a lower surface 14B on the opposite side from the upper surface 14A. The insulating layer 14 is located on the insulating layer 13 and covers the insulating layer 13 and the metal wiring line ML. The common electrode CE is located on the insulating layer 14. The insulating layer 15 is located on the common electrode CE and covers the common electrode CE. In other words, the insulating layer 13, the insulating layer 14 and the common electrode CE are located between the insulating layer 12 and the insulating layer 15 located above the insulating layer 12. The pixel electrode PE (PE1) is located on the insulating layer 15. The alignment film AL1 is located on the insulating layer 15 and covers the insulating layer 15 and the pixel electrode PE. Note that other layers may be located between the layers in the first substrate SUB1.

The insulating layers 11, 12 and 15 are inorganic insulating layers formed of an inorganic insulating material such as silicon oxide, silicon nitride or silicon oxynitride. The insulating layers 11, 12 and 15 may have a single-layer structure or may have a multilayer structure. The insulating layers 13 and 14 are organic insulating layers (organic films) formed of an organic insulating material such as acrylic resin.

The second substrate SUB2 comprises an insulating substrate 20, a light-shielding layer BM, a color filter CF, an overcoat layer OC, an alignment film AL2 and the like.

The insulating substrate 20 is a light transmissive substrate such as a glass substrate or a resin substrate as is the case with the insulating substrate 10. The insulating substrate 20 has an upper surface 20A and a lower surface 20B on the opposite side from the upper surface 20A. The light-shielding layer BM and the color filter CF are located on the lower surface 20B side which is opposed to the insulating substrate 10. The color filter CF is disposed at a position opposed to the pixel electrode PE (PE1), and a part of the color filter CF is superposed on the lower side of the light-shielding layer BM. The color filter CF has a red color filter CFR, a green color filter CFG and a blue color filter CFB. Note that the color filter CF may have a white color filter. The overcoat layer OC is located below the color filter CF and covers the color filter CF. The overcoat layer OC is formed of transparent resin. The alignment film AL2 is located below the overcoat layer OC and covers the overcoat layer OC. The alignment film AL1 and the alignment film AL2 are formed of, for example, a material exhibiting horizontal alignment properties. Note that other layers may be located between the layers in the second substrate SUB2.

The first substrate SUB1 and the second substrate SUB2 described above are arranged such that the alignment film AL1 and the alignment film AL2 are opposed to each other. The first substrate SUB1 and the second substrate SUB2 are bonded together by the sealing member SE described above while a predetermined cell gap is being formed as shown in FIG. 7. The liquid crystal layer LC is held between the alignment film AL1 and the alignment film AL2. The liquid crystal layer LC comprises liquid crystal molecules LM. The liquid crystal layer LC is composed of a positive-type liquid crystal material (with positive dielectric anisotropy) or a negative-type liquid crystal material (with negative dielectric anisotropy).

An optical element OD1 including a polarizer PL1 is bonded to the insulating substrate 10. An optical element OD2 including a polarizer PL2 is bonded to the insulating substrate 20. Note that each of the optical element OD1 and the optical element OD2 may comprise a retardation film, a scattering layer, an antireflective layer and the like.

In the display panel PNL described above, the liquid crystal molecules LM are initially aligned in a predetermined direction between the alignment film AL1 and the alignment film AL2 in an off state in which no electric field is produced between the pixel electrode PE and the common electrode CE. In the off state described above, light emitted from an illumination device IL toward the display panel PNL is absorbed by the optical element OD1 and the optical element OD2, and dark display is performed. On the other hand, in an on state in which an electric field is produced between the pixel electrode PE and the common electrode CE, the liquid crystal molecules LM are aligned in a direction different from the initial alignment direction by an electric field, and the alignment direction is controlled by the electric field. In the on state described above, a part of the light from the illumination device IL is transmitted through the optical element OD1 and the optical element OD2, and bright display is performed.

Figure 8:
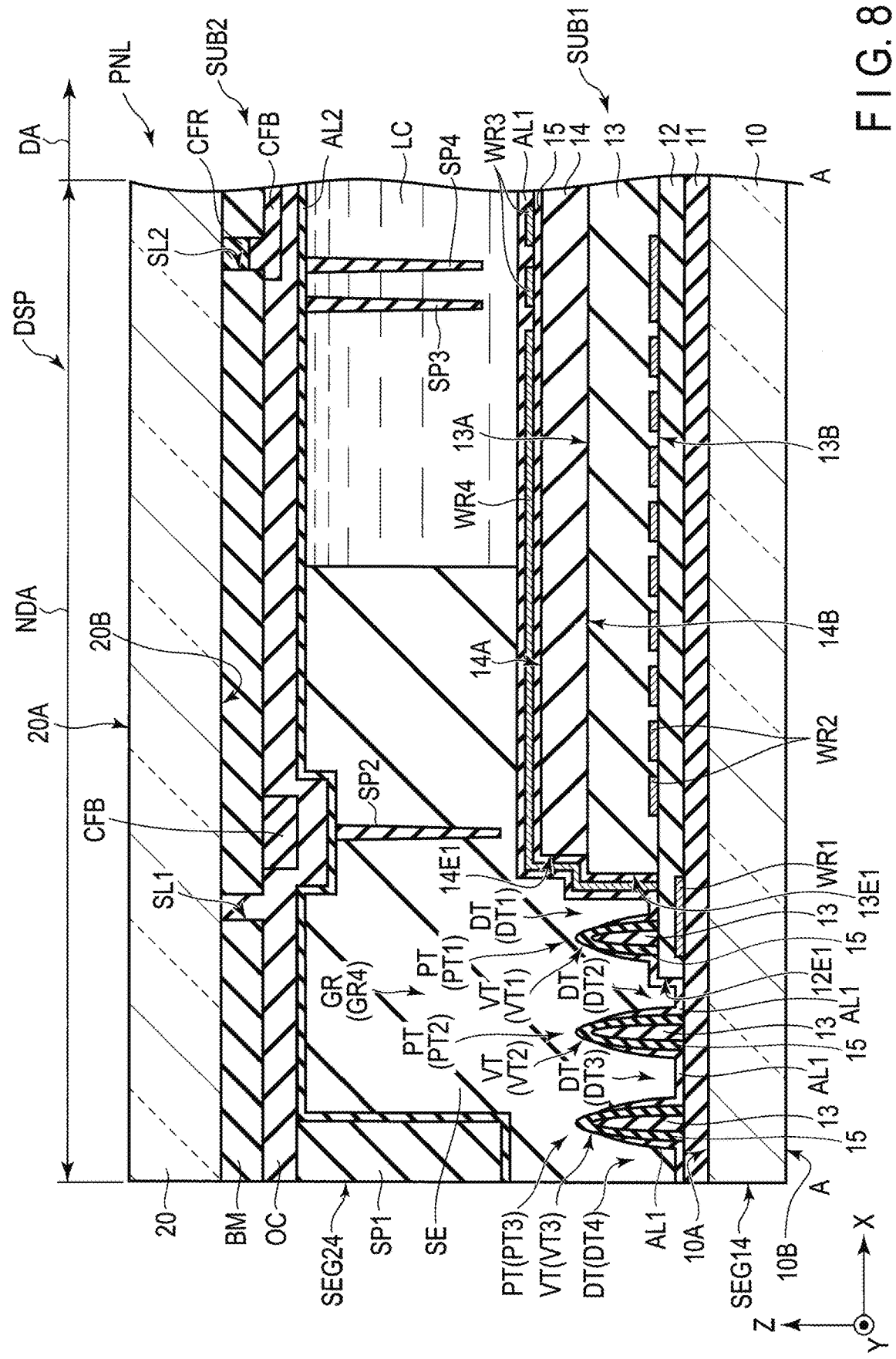
FIG. 8 is a cross-sectional view of the display panel taken along line A-A shown in FIGS. 1 to 3.

FIG. 8 is a cross-sectional view of the display panel PNL taken along line A-A shown in FIGS. 1 to 3. FIG. 8 shows the non-display area NDA of the display panel PNL.

The first substrate SUB1 has the groove GR in the non-display area NDA. In the example shown in FIG. 8, the groove GR4 penetrates the insulating layers 12 to 14 and the like. The groove GR4 is located between an end portion 12E1 of the insulating layer 12, an end portion 13E1 of the insulating layer 13 and an end portion 14E1 of the insulating layer 14, and the substrate side edge SEG14. The end portion 13E1 is closer to the display area DA than it is to the substrate side edge SEG14. The end portion 12E1 is closer to the substrate side edge 14 than the end portion 13E1 in the first direction X. The end portion 14E1 is closer to the display area DA than the end portion 13E1 in the first direction X. In other words, the end portion 12E1 is exposed on the outside of the insulating layer 13 and the insulating layer 14 in the groove GR4, and the end portion 13E1 is exposed on the outside of the insulating layer 14 in the groove GR4. Note that the end portion 12E1 may be located at the same position as the end portion 13E1 or may be closer to the display area DA than the end portion 13E1 in the first direction X. The end portion 14E1 may be located at the same position as the end portion 13E1 or may be closer to the substrate side edge SEG14 than the end portion 13E1 in the first direction X. In one example, the width of the groove GR from the end portion 14E1 to the substrate side edge SEG14 is 150 μm to 200 μm. By the groove GR formed as described above, intrusion passages of moisture from the outside of the display panel PNL into the insulating layers 13 and 14 can be blocked.

The first substrate SUB1 comprises peripheral wiring lines WR1 to WR4 and the like in the non-display area NDA. The peripheral wiring line WR1 is disposed in the same layer as the scanning line G and is formed of the same material as the scanning line G. In the example shown in FIG. 8, the peripheral wiring line WR1 is located between the insulating layer 11 and the end portion 12E1 of the insulating layer 12. Note that the peripheral wiring line WR1 may be located inside the insulating layer 12 in the third direction Z. In this case, the scanning line G is located inside the insulating layer 12 in the same manner as the peripheral wiring line WR1 in the third direction Z. Since the peripheral wiring line WR1 functions as a guard ring which prevents the influence of static electricity or an electric field from the outside on the display area DA or a light-shielding layer which prevents leakage of light, the peripheral wiring line WR1 is disposed on the outside of various other wiring lines. In the example shown in FIG. 8, in order to cover the peripheral wiring line WR1, the end portion 12E1 extends farther toward the substrate side edge SEG14 side than the end portion 13E1 of the insulating layer 13 and the end portion 14E1 of the insulating layer 14. However, since the adhesion strength between the insulating layer 11 and the insulating layer 12 is low, the end portion 12E1 does not extend to the substrate side edge SEG14. In other words, the end portion 12E1 is closer to the display area DA than the substrate side edge SEG14. The peripheral wiring line WR2 is disposed in the same layer as the signal line S and is formed of the same material as the signal line S. In the example shown in FIG. 8, the peripheral wiring line WR2 is located between the insulating layer 12 and the insulating layer 13. The insulating layer 15 extends from above the insulating layer 14 to the side surface of the end portion 13E1 through the side surface of the end portion 14E1. Since the end portion 13E1 and the end portion 14E1 form steps, the insulating layer 15 is easily attached to the end portions 13E1 and 14E1. The peripheral wiring lines WR3 and WR4 are disposed in the same layer as the pixel electrode PE and are formed of the same material as the pixel electrode PE. In the example shown in FIG. 8, the peripheral wiring lines WR3 and WR4 are located between the insulating layer 15 and the alignment film AL1. The peripheral wiring line WR3 is closer to the display area DA than the peripheral wiring line WR4 on the insulating layer 15. The peripheral wiring line WR4 extends along the insulating layer 15 from above the insulating layer 14 to the side surface side of the end portion 13E1 through the end portion 14E1 side. The alignment film AL1 extends from above the insulating layer 15 and the peripheral wiring line WR4 to the groove GR4 through the end portion 13E1 side and the end portion 14E1 side. In other words, the alignment film AL1 is located on the insulating layer 13 and the insulating layer 14. For example, if the alignment film AL1 is directly disposed on the insulating layer 15, since the adhesion strength of the alignment film AL to the insulating layer 15 is low, the alignment film AL may be detached. In the present embodiment, the adhesion strength of the peripheral wiring line WR4 to the insulating layer 15 and the alignment film AL1 is sufficiently higher than, for example, the adhesion strength of the alignment film AL1 to the insulating layer 15, the possibility of detachment of the peripheral wiring line WR4 from the insulating layer 15 or the alignment film AL1 is lower than, for example, the possibility of detachment of the alignment film AL1 from the insulating layer 15. However, if the peripheral wiring line WR4 is extended to the substrate side edge SEG14, problems such as electrostatic discharge (ESD) and corrosion of the peripheral wiring line WR4 may occur.

The first substrate SUB1 comprises a projection PT (PT1, PT2, PT3 . . . ), a recess DT (DT1, DT2, DT3 . . . ) and the like in the non-display area NDA. In the following description, a portion recessed from the projection PT in the non-display area NDA, for example, in the groove GR will be referred to as the recess DT (DT1, DT2, DT3 and DT4 . . . ). The projection PT is located, for example, in the groove GR and projects toward the second substrate SUB2. The projection PT includes, for example, the insulating layer 13 and the insulating layer 15, and is formed of these layers which are stacked in this order. In one example, the adhesion strength of the projection PT to the alignment film AL is low. Note that the projection PT may include the alignment film AL1. The projection PT may include at least one of the insulating layer 13 and the insulating layer 15. In addition, the projection PT may include a layer other than the insulating layer 13, the insulating layer 15 and the alignment film AL1. Furthermore, another projection may be referred to as the projection PT in some cases. The projection PT has a top portion VT which is not covered with the alignment film AL1. In other words, at least the top portion VT of the projection PT is exposed on the outside of the alignment film AL1. The portion other than the top portion VT of the projection PT is covered with the alignment film AL1. Note that a portion other than the top portion VT of the projection PT may be exposed on the outside of the alignment film AL1 or the entire projection PT may be exposed on the outside of the alignment film AL1. The cross-sectional shape of the projection PT is, for example, a shape tapered at an acute angle toward the second substrate SUB2. In one example, the cross-sectional shape of the projection PT is a substantially rectangular shape. The thickness of the projection PT is, for example, greater than or equal to the thickness of the insulating layer 13. In other words, the thickness of the projection PT is, for example, greater than or equal to half of the thickness of the insulating layer 13 and the insulating layer 14. In one example, the thickness of the projection PT is 2.0 μm to 3.0 μm, and the width in the first direction X of the projection PT is 7.0 μm. Since the projection PT has the cross-sectional shape and the thickness described above, when the alignment film AL is applied to the projection PT at the time of manufacturing, the alignment film AL runs down to the lower side of the projection PT, and at least the top portion VT of the projection PT becomes exposed on the outside of the alignment film AL1. Note that the projection PT may have a cross-sectional shape other than the above-described shape if the projection PT has such a cross-sectional shape that the portion exposed on the outside of the alignment film AL1 will be formed in the manufacturing process of the first substrate SUB1. In addition, the projection PT may have a thickness less than the thickness of the insulating layer 13 if the projection PT has such a thickness that the portion exposed on the outside of the alignment film Al1 will be formed in the manufacturing process of the first substrate SUB1. The projection PT is, for example, in contact with the sealing member SE. The top portion VT may be bonded to the sealing member SE with sufficient adhesion strength, for example, with higher adhesive strength than the insulating layer 15 and the alignment film AL1. The recess DT is located between two adjacent projections PT and penetrates the insulating layers 13 and 14 and the like, for example.

In the example shown in FIG. 8, the projection PT1, the projection PT2 and the projection PT3 are arranged in the first direction X while being spaced apart from each other in the groove GR4. The projection PT1 is located on the end portion 12E1. The projections PT2 and PT3 are located on the insulating layer 11. The projection PT2 is separated from the projection PT1 to the substrate side edge SEG14 side in the first direction X. The projection PT3 is separated from the projection PT2 to the substrate side edge SEG14 side in the first direction X. The projection PT1 is located at a higher position than the projections PT2 and PT3 in the third direction Z. Note that another layer may be located between the projection PT1 and the insulating layer 12. Another layer may be located between the projections PT2 and PT3 and the insulating layer 11. The projection PT1 may not be located on the end portion 12E1. The projection PT1 may be located on both the end portion 12E1 and the insulating layer 11. In addition, the projection PT2 may be located on the end portion 12E1. A top portion VT1 of the projection PT1, a top portion VT2 of the projection PT2 and a top portion VT3 of the projection PT3 are bonded to the sealing member SE. Note that at least one of the top portions VT1 to VT3 needs to be bonded to the sealing member SE. The recess DT1 is located between the projection PT1 and the end portion 13E1 of the insulating layer 13. The recess DT2 is located between the projections PT1 and PT2. The recess DT3 is located between the projections PT2 and PT3. The recess DT4 is located between the projection PT3 and the substrate side edge SEG14. The alignment film AL1 is located in the recesses DT1 to DT4. Note that another layer may be located on the insulating layer 11 in the recesses DT1 to DT4. Note that, although three projections PT are disposed in the example shown in FIG. 8, more than three projections PT may be disposed or less than three projections PT may be disposed.

The light-shielding layer BM has a slit SL1 penetrating to the insulating substrate 20. Since the slit SL1 is formed, intrusion of moisture via the light-shielding layer BM can be prevented. Note that, since the peripheral wiring line WR1 is disposed at a position overlapping the slit SL1, the peripheral wiring line WR1 prevents leakage of light from the slit SL1. In addition, the light-shielding layer BM has a slit SL2 in an area overlapping the liquid crystal layer LC. Since the slit SL2 is formed, transfer of an electric charge to the display area DA via the light-shielding layer BM can be blocked. Consequently, in the manufacturing process of the display panel PNL, concentration of static electricity on the display area DA can be suppressed and damage of the display panel PNL can be suppressed. Note that, since the peripheral wiring line WR2 described above is disposed at a position overlapping the slit SL2, the peripheral wiring line WR2 prevents leakage of light from the slit SL2. Further, color filers CFR and CFB are superposed in the third direction Z inside the slit SL2. Therefore, even if light is transmitted around the peripheral wiring line WR2, leakage of the light from the slit SL2 can still be suppressed.

Spacers SP1 to SP4 are disposed in the second substrate SUB2 and project toward the first substrate SUB1. The spacers SP1 to SP4 are formed of a resin material. In addition, a color filter CFB for height adjustment is disposed at a position overlapping the spacer SP2. Note that a color filter CFB for height adjustment may be disposed at a position overlapping the spacer SP1. The liquid crystal layer LC is surrounded by the first substrate SUB1, the second substrate SUB2 and the sealing member SE.

Figure 9:
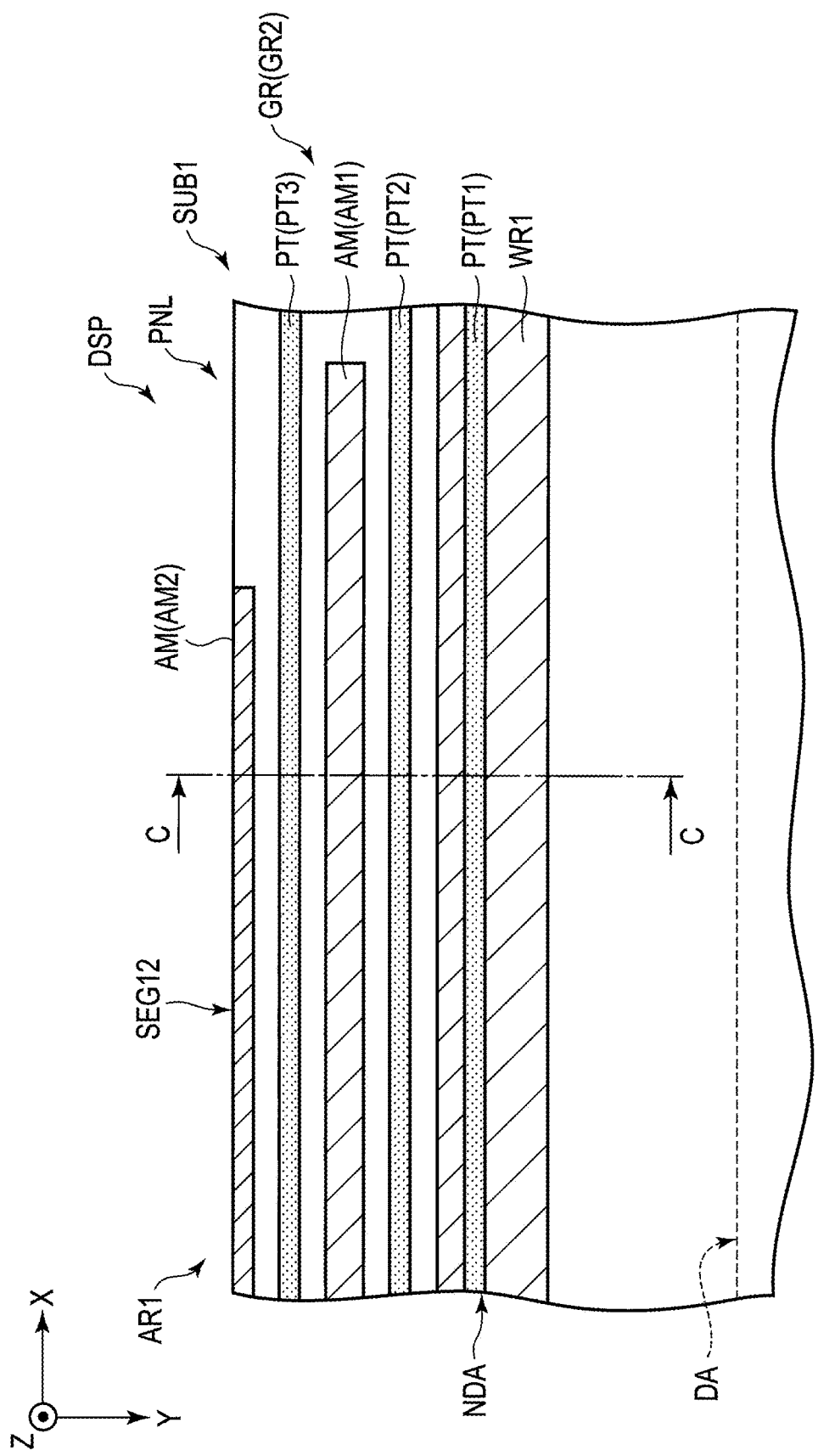
FIG. 9 is a plan view schematically showing a configuration example of a first substrate in an area AR1 shown in FIGS. 1 and 2.

FIG. 9 is a plan view schematically showing a configuration example of the first substrate SUB1 in an area AR1 shown in FIGS. 1 and 2. Only the structures necessary for explanation are illustrated in FIG. 9.

The first substrate SUB1 comprises a plurality of metal wiring lines AM (AM1, AM2 . . . ) in the non-display area NDA. Note that the first substrate SUB1 may comprise only one metal wiring line AM. The metal wiring lines AM are located in the non-display area NDA. The metal wiring lines AM are arranged and spaced apart from each other in the second direction Y. The metal wiring lines AM are used for checking dimensions at the time of grinding, for example. The metal wiring lines AM are disposed, for example, in a curved area or at a start position, an end position and an intermediate position between the start position and the end portion of an area to be ground, when the display panel PNL is planarly viewed. The projections PT do not overlap the metal wiring lines AM. Note that the projections PT may overlap the metal wiring lines AM. In the example shown in FIG. 9, the metal wiring lines AM1 and AM2 extend in the first direction X. The metal wiring line AM1 is separated from the peripheral wiring line WR1 to the substrate side edge SEG12 side in the second direction Y. The metal wiring line AM2 is separated from the metal wiring line AM1 to the substrate side edge SEG12 side in the second direction Y. The projection PT1 overlaps the peripheral wiring line WR1. The projection PT2 is located between the metal wiring line AM1 and the peripheral wiring line WR1. The projection PT3 is located between the metal wiring lines AM1 and AM2.

Note that the configuration of the first substrate SUB1 in the area AR1 shown in FIG. 9 can be applied to the first substrate SUB1 in an area AR2 shown in FIG. 3.

Figure 10:
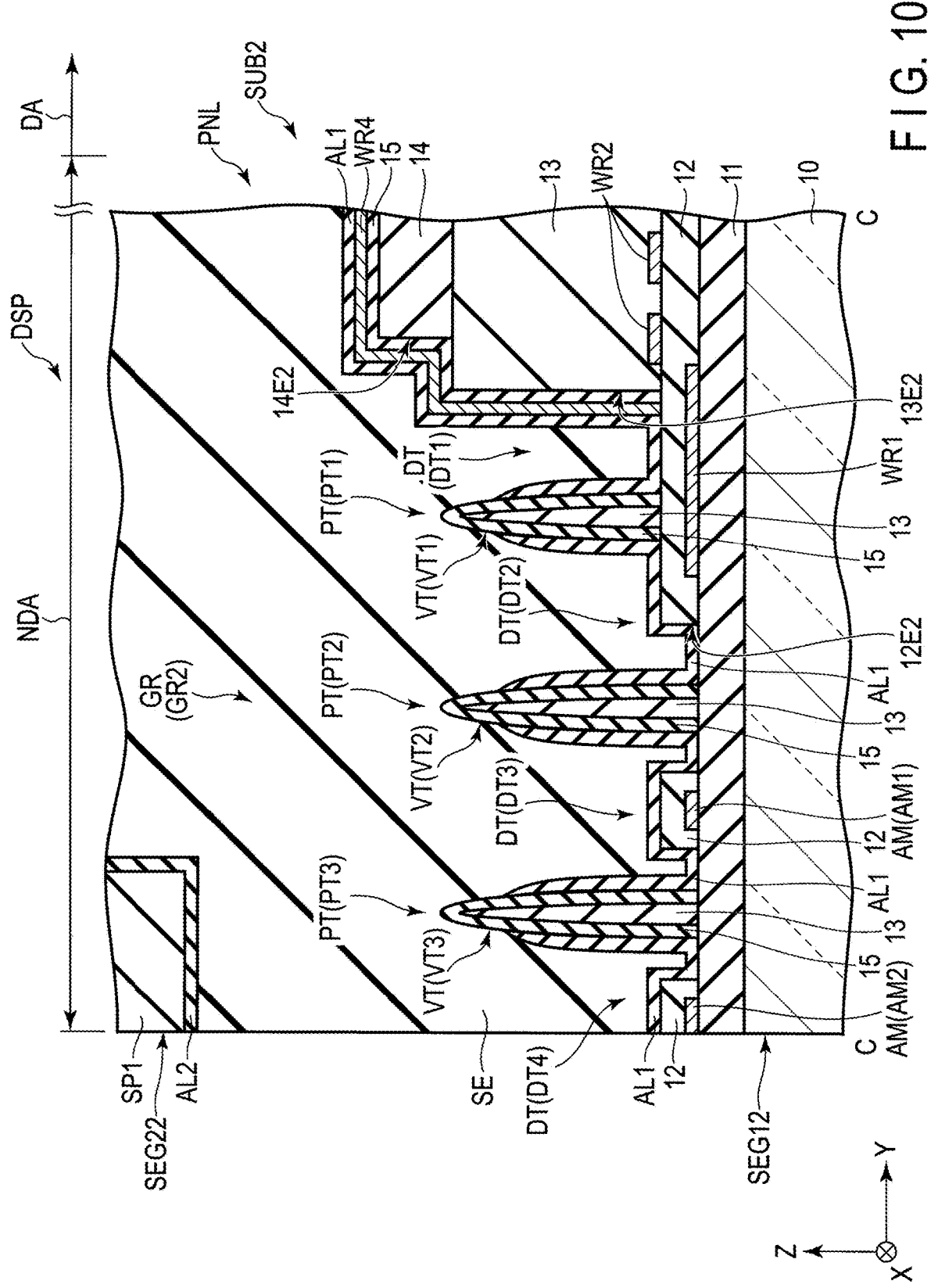
FIG. 10 is a cross-sectional view of the display panel taken along line C-C shown in FIG. 9.

FIG. 10 is a cross-sectional view of the display panel PNL taken along line C-C shown in FIG. 9. FIG. 10 shows the non-display area NDA of the display panel PNL.

In the example shown in FIG. 10, the groove GR2 penetrates the insulating layers 12 to 14 and the like. The groove GR2 is located between an end portion 12E2 of the insulating layer 12, an end portion 13E2 of the insulating layer 13 and an end portion 14E2 of the insulating layer 14, and the substrate side edge SEG12. The end portion 13E2 is closer to the display area DA than it is to the substrate side edge SEG12. The end portion 12E2 is closer to the substrate side edge SEG12 than the end portion 13E2 in the second direction Y. The end portion 14E2 is closer to the display area DA than the end portion 13E2 in the second direction Y. In other words, the end portion 12E2 is exposed on the outside of the insulating layer 13 and the insulating layer 14 in the groove GR2, and the end portion 13E2 is exposed on the outside of the insulating layer 14 in the groove GR2. Note that the end portion 12E2 may be located at the same position as the end portion 13E2 or may be closer to the display area DA than the end portion 13E2 in the second direction Y. The end portion 14E2 may be located at the same position as the end portion 13E2 or may be closer to the substrate side edge SEG12 than the end portion 13E2 in the second direction Y.

In the example shown in FIG. 10, the metal wiring line AM1 and the metal wiring line AM2 are arranged in the second direction Y while being spaced apart from each other in the groove GR2. The metal wiring lines AM1 and AM2 are located on the insulating layer 11. The metal wiring line AM1 is separated from the peripheral wiring line WR1 to the substrate side edge SEG12 side in the second direction Y. In other words, the metal wiring line AM1 is located in the recess DT3. The metal wiring line AM2 is separated from the metal wiring line AM1 to the substrate side edge SEG12 side in the second direction Y. In other words, the metal wiring line AM2 is located in the recess DT4. Each of the metal wiring line AM1 and the metal wiring line AM2 is covered with the insulating layer 12 and the alignment film AL1. The projection PT1 is located on the end portion 12E2. The projection PT2 is located between the peripheral wiring line WR1 and the metal wiring line AM1. Note that the projection PT2 may be located on the metal wiring line AM1 or may be located on both the metal wiring line AM1 and the insulating layer 11. The projection PT3 is located between the metal wiring lines AM1 and AM2. Note that the projection PT3 may be located on the metal wiring line AM2 or may be located on both the metal wiring line AM2 and the insulating layer 11.

Figure 11:
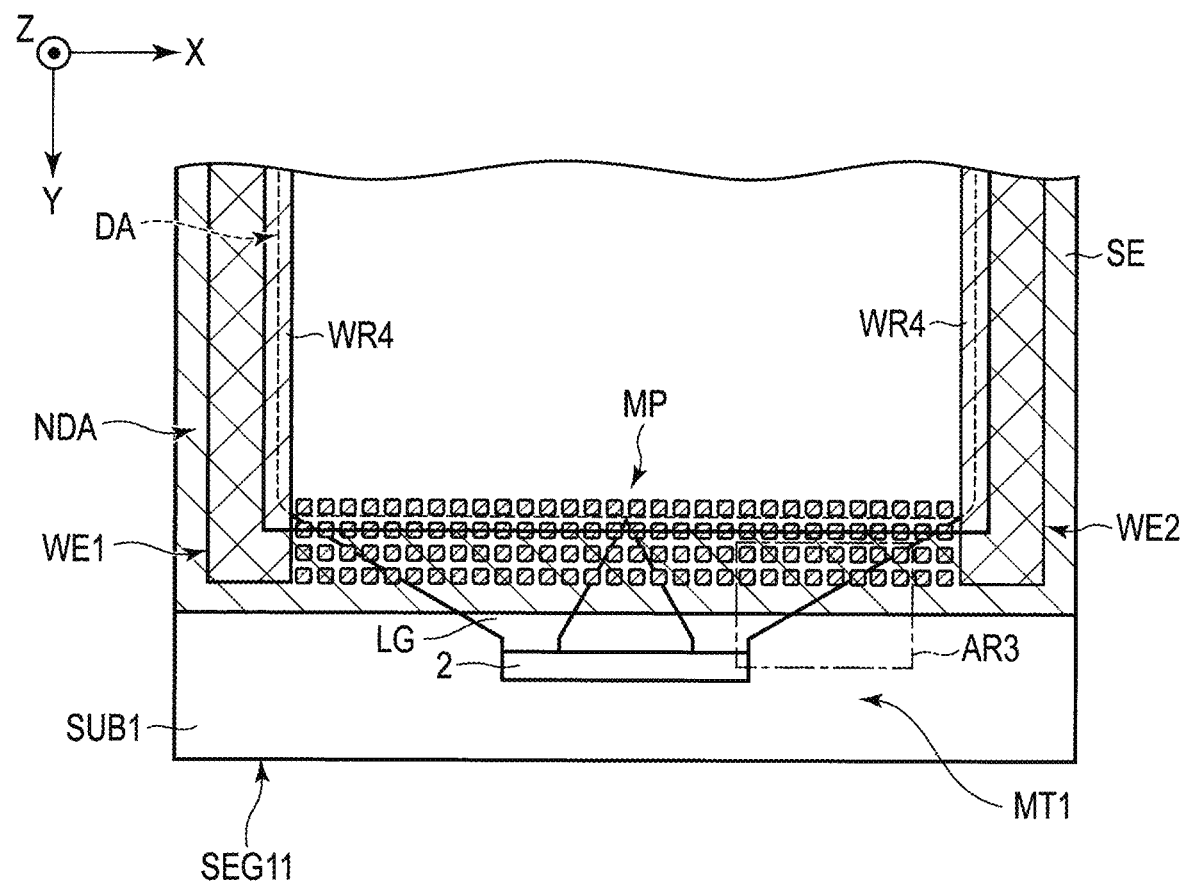
FIG. 11 is a plan view schematically showing a configuration example of a mounting portion side of the first substrate shown in FIG. 1.

FIG. 11 is a plan view schematically showing a configuration example of the mounting portion MT1 side of the first substrate SUB1 shown in FIG. 1. Only the structures necessary for explanation are illustrated in FIG. 11.

The first substrate SUB1 comprises a transparent conductive film pattern MP and a wiring line group LG on the mounting portion MT1 side. In the transparent conductive film pattern MP, a plurality of transparent conductive films formed of the same material as the pixel electrode are arranged in a floating state in a pattern of dots. The transparent conductive film pattern MP overlaps the wiring line group LG. For example, the wiring line group LG includes, for example, a plurality of wiring lines formed of the same material as the signal line S, and is connected to the IC chip 2, the FPC substrate 3 or the like. In one example, the wiring line group LG includes a plurality of signal lines S. If the solid peripheral wiring line WR4 overlaps the wiring line group LG, a parasitic capacitance may be produced between the wiring line group LG and the peripheral wiring line WR4. In the present embodiment, since the transparent conductive film pattern MP overlaps the wiring line group LG on the mounting portion MT1 side, the parasitic capacitance between the wiring line group LG the peripheral wiring line WR4 can be suppressed.

In FIG. 11, the peripheral wiring line WR4 and the transparent conductive film pattern MP are indicated by diagonal lines slanting upward to the right, and the sealing member SE is indicated by diagonal lines slanting upward to the left. In the example shown in FIG. 11, the wiring line group LG extends from the display area DA toward the mounting portion MT1 side in the second direction Y. In addition, the wiring line group LG converges toward the IC chip 2, for example, a connecting terminal connected to the IC chip 2 and is connected to the IC chip 2. Note that, in the case of using an external circuit such as an FPC board on which the IC chip 2 is mounted, for example, the wiring line group LG may converge toward a connecting terminal to which the FPC substrate is connected and may be connected to this connecting terminal. The peripheral wiring line WR4 is arranged in a frame shape around the display area DA and is disconnected on the mounting portion MT1 side. The peripheral wiring line WR4 is disposed in both the display area DA and the non-display area NDA. Note that the peripheral wiring line WR4 may be disposed only in the non-display area NDA. The transparent conductive film pattern MP is located between an end portion WE1 and an end portion WE2 on the mounting portion MT1 side of the peripheral wiring line WR4, and overlaps the wiring line group LG. The sealing member SE overlaps the peripheral wiring line WR4 and the transparent conductive film pattern MP.

Note that the configuration of the mounting portion MT1 of the first substrate SUB1 shown in FIG. 11 can be applied to the configuration of the mounting portion MT1 of the first substrate SUB1 shown in FIG. 2 and the configuration of the mounting portion MT1 of the first substrate SUB1 shown in FIG. 3.

Figure 12:
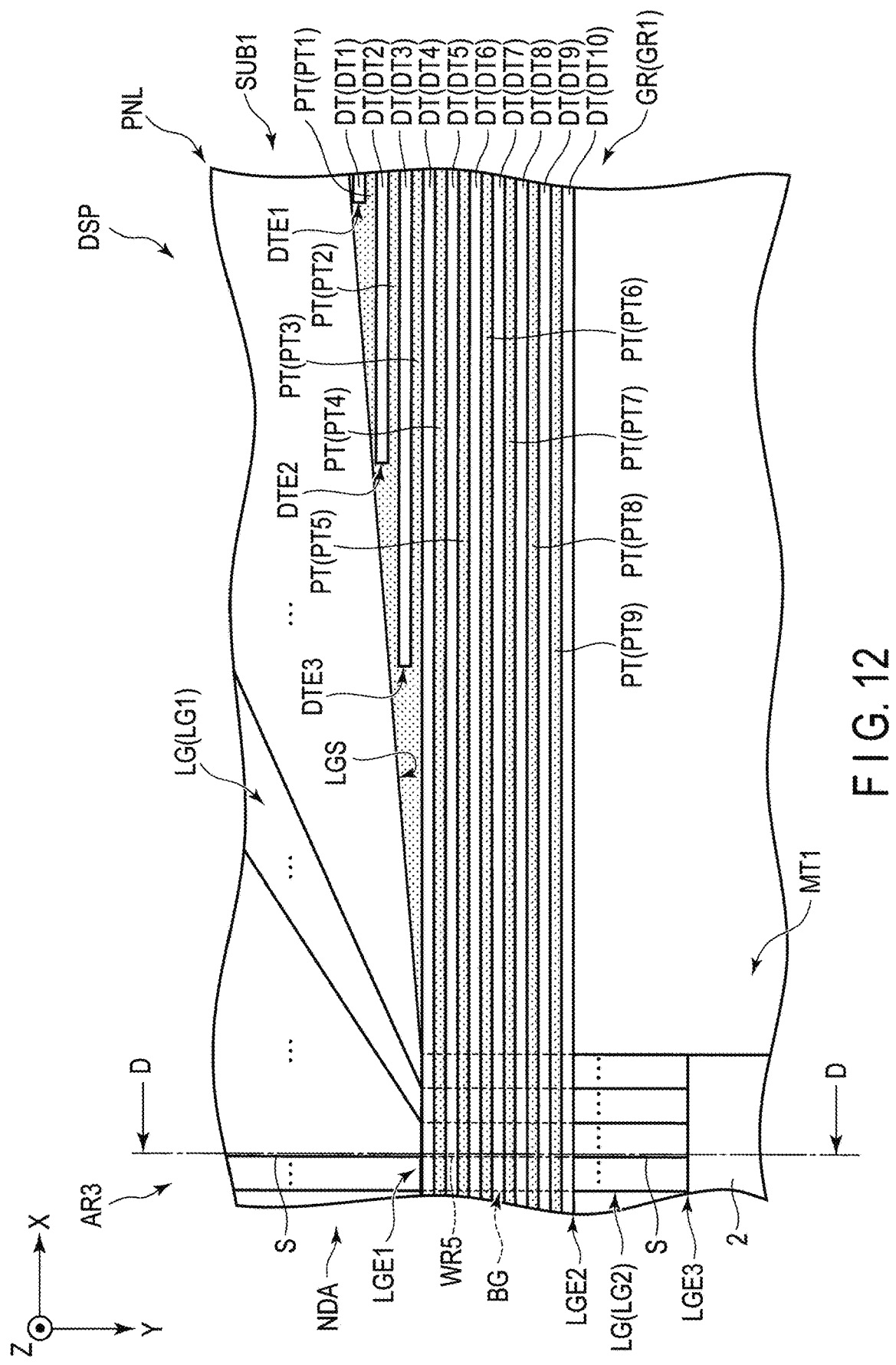
FIG. 12 is a plan view schematically showing a configuration example of the first substrate in an area shown in FIG. 11.

FIG. 12 is a plan view schematically showing a configuration example of the first substrate SUB1 in an area AR3 shown in FIG. 11. Only the structures necessary for explanation are illustrated in FIG. 12.

The first substrate SUB1 comprises a wiring line group BG. The wiring line group BG includes a plurality of peripheral wiring lines WR5 formed of the same material as the scanning line G, for example. In the example shown in FIG. 12, the wiring line group LG converges toward the IC chip 2 in the second direction Y. The wiring line group LG includes a wiring line group LG1 located on the display area DA side and a wiring line group LG2 located on the IC chip 2 side. A side part LGS of the wiring line group LG1 obliquely extends from the outside toward an end part LGE1 of the wiring line group LG1. In other words, a wiring line LGS (for example, a signal line S) located at an outermost position of the wiring line group LG1 obliquely extends from the outside toward the end part LGE1. The end part LGE1 and an end part LGE2 of the wiring line group LG2 are connected to each other via the wiring line group BG. An end part LGE3 of the wiring line group LG2 on the opposite side from the end part LGE2 is connected to the IC chip 2, for example. Note that the end part LGE3 may be connected to another external circuit such as an FPC board.

In the example shown in FIG. 12, recesses DT1, DT2, DT3, DT4, DT5, DT6, DT7, DT8, DT9 and DT10 extend in the first direction X and are arranged and spaced apart from each other in the second direction Y. The recesses DT1 to DT10 do not overlap the wiring line group LG. The recess DT1 extends toward the side part LGS in the first direction X. A leading end portion DTE1 of the recess DT1 is separated from the side part LGS in the first direction X. The recess DT2 extends toward the side part LGS in the first direction X and is separated from the recess DT1 in the second direction Y. A leading end portion DTE2 of the recess DT2 is separated from the side part LGS in the first direction X. The leading end portion DTE2 is closer to the IC chip 2 than the leading end portion DTE1 in the first direction X. In other words, the leading end portion DTE1 is farther from the IC chip 2 than the leading end portion DTE2 in the first direction X. The recess DT3 extends toward the side part LGS and is separated from the recess DT2 in the second direction Y. A leading end portion DTE3 of the recess DT3 is separated from the side part LGS in the first direction X. The leading end portion DTE3 is closer to the IC chip 2 than the leading end portion DTE2 in the first direction X. In other words, the leading end portion DTE2 is farther from the IC chip 2 than the leading end portion DTE3 in the first direction X. The recess DT1 to the recess DT3 are arranged stepwise along the side part LGS. That is, the recesses DT1 to DT3 are deviated from each other in the first direction X. The recesses DT4 to DT10 overlap the wiring line group BG. The recess DT4 extends in the first direction X and is separated from the recess DT3 in the second direction Y. The recess DT5 extends in the first direction X and is separated from the recess DT4 in the second direction Y. The recess DT6 extends in the first direction X and is separated from the recess DT5 in the second direction Y. The recess DT7 extends in the first direction X and is separated from the recess DT6 in the second direction Y. The recess DT8 extends in the first direction X and is separated from the recess DT7 in the second direction Y. The recess DT9 extends in the first direction X and is separated from the recess DT8 in the second direction Y. The recess DT10 extends in the first direction X and is separated from the recess DT9 in the second direction Y.

In the example shown in FIG. 12, the projections PT (PT1, PT2, PT3, PT4, PT5, PT6, PT7, PT8 and PT9) extend in the first direction X and do not overlap the wiring line group LG. The projection PT1 is located between the recess DT1 and the recess DT2 in the second direction Y. The projection PT2 is located between the recess DT2 and the recess DT3 in the second direction Y. The projection PT3 is located between the recess DT3 and the recess DT4 in the second direction Y. The projection PT4 is located between the recess DT4 and the recess DT5 in the second direction Y. The projection PT5 is located between the recess DT5 and the recess DT6 in the second direction Y. The projection PT6 is located between the recess DT6 and the recess DT7 in the second direction Y. The projection PT7 is located between the recess DT7 and the recess DT8 in the second direction Y. The projection PT8 is located between the recess DT8 and the recess DT9 in the second direction Y. The projection PT9 is located between the recess DT9 and the recess DT10 in the second direction Y. The projection PT4 to the projection PT9 overlap the wiring line group BG. Since the recesses DT and the projections PT are arranged as described above, even if the frame is narrowed and little space is left around the wiring line group LG, the recesses DT and the projections PT can still be formed on the mounting portion MT side of the first substrate SUB1.

Figure 13:
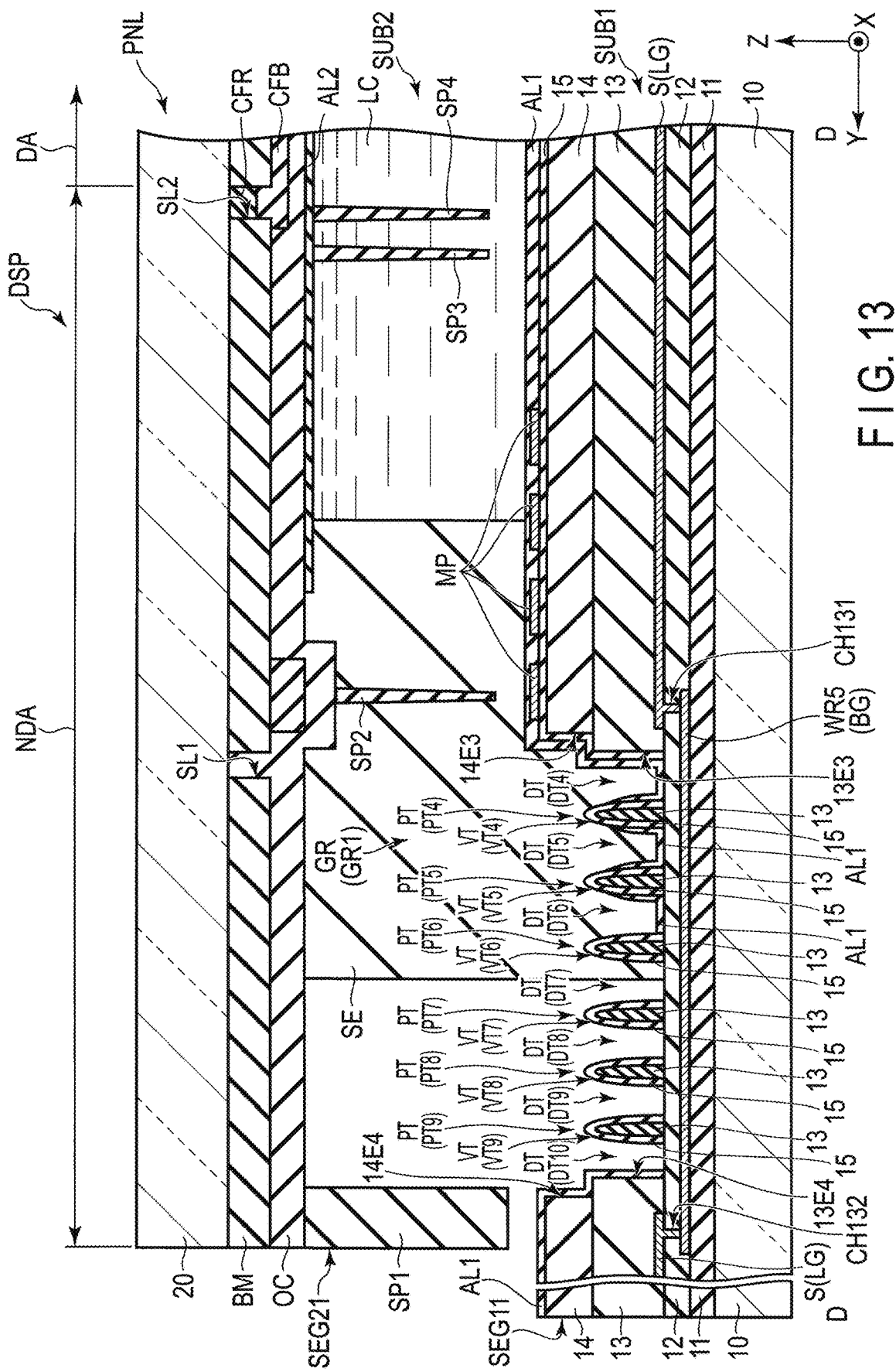
FIG. 13 is a cross-sectional view of the display panel taken along line D-D shown in FIG. 12.

FIG. 13 is a cross-sectional view of the display panel PNL taken along line D-D shown in FIG. 12. FIG. 13 shows the non-display area NDA of the display panel PNL. Only the structures necessary for explanation are illustrated in FIG. 13.

In the example shown in FIG. 13, the groove GR1 penetrates the insulating layers 13 and 14. The groove GR1 is located between an end portion 13E3 of the insulating layer 13 and an end portion 14E3 of the insulating layer 14, and an end portion 13E4 of the insulating layer 13 and an end portion 14E4 of the insulating layer 14. The end portion 13E3 and the end portion 13E4 are separated from each other in the second direction Y. The end portion 13E3 and the end portion 13E4 are opposed to each other in the second direction Y. The end portions 13E3 and 13E4 are closer to the display area DA than they are to the substrate side edge SEG11. The end portion 13E3 is closer to the display area DA than the end portion 13E4 in the second direction Y. The end portion 14E3 and the end portion 14E4 are separated from each other in the second direction Y. The end portion 14E3 and the end portion 14E4 are opposed to each other in the second direction Y. The end portion 14E3 is closer to the display area DA side than the end portion 14E4 in the second direction Y. The end portion 14E3 is closer to the display area DA than the end portion 13E3 in the second direction Y. Note that the end portion 14E3 may be located at the same position as the end portion 13E3 or may be closer to the substrate side edge SEG11 than the end portion 13E3 in the second direction Y. The end portion 14E4 is closer to the substrate side edge SEG11 than the end portion 13E4 in the second direction Y. Note that the end portion 14E4 may be located at the same position as the end portion 13E4 or may be closer to the display area DA than the end portion 13E4 in the second direction Y. In other words, the end portion 13E3 and the end portion 13E4 are exposed on the outside of the insulating layer 14 in the groove GR1.

The first substrate SUB1 comprises the peripheral wiring line WR5 (wiring line group BG), the transparent conductive film pattern MP and the like in the non-display area NDA. The peripheral wiring line WR5 is disposed in the same layer as the scanning line G. The transparent conductive film pattern MP is disposed in the same layer as the pixel electrode PE. In the example shown in FIG. 13, the peripheral wiring line WR5 is located between the insulating layer 11 and the insulating layer 12 and extends in the second direction Y. The peripheral wiring line WR5 overlaps the groove GR1. In other words, the peripheral wiring line WR5 is opposed to the groove GR1. The width in the second direction Y of the peripheral wiring line WR5 is greater than the width in the second direction Y of the groove GR. Note that the peripheral wiring line WR5 may be located inside the insulating layer 12 in the third direction Z. The signal line S (LG) is located between the insulating layer 12 and the insulating layer 13 and is disconnected in the groove GR. The signal line S extends from the display area DA side to the end portion 13E3 of the insulating layer 13. The signal line S is connected to the peripheral wiring line WR5 via a contact hole CH131 penetrating the insulating layer 12 in the end portion 13E3. The signal line S is connected to the peripheral wiring line WR5 via a contact hole CH132 penetrating the insulating layer 12. The signal line S extends from the end portion 13E4 of the insulating layer 13 to the substrate side edge SEG11 side. The insulating layer 15 extends from above the insulating layer 14 to the side surface of the end portion 13E3 through the side surface of the end portion 14E3. The transparent conductive film pattern MP overlaps the signal line S. The transparent conductive film pattern MP is located on the insulating layer 15 and is located between the insulating layer 15 and the alignment film AL1. The alignment film AL1 extends from above the insulating layer 15 and the transparent conductive film pattern MP to the groove GR1 through the end portion 14E3 side and the end portion 13E3 side.

In the example shown in FIG. 13, the projections PT4 to PT9 are arranged in the second direction Y while being spaced apart from each other in the groove GR1. The projections PT4 to PT9 are located on the insulating layer 12.

The projections PT7 to PT9 are exposed on the outside of the alignment film AL1. Top portions VT4 to VT6 overlap the sealing member SE and are bonded to the sealing member SE. In other words, the sealing member SE is disposed over the projections PT4 to PT6 and overlaps the projections PT4 to PT6. The projections PT7 to PT9 do not overlap the sealing member SE. Note that another layer may be located between the projections PT4 to PT9 and the insulating layer 12. In addition, the projections PT4 to PT9 may be exposed on the outside of the alignment film AL1. The recess DT4 is located between the end portion 13E3 of the insulating layer 13 and the projection PT4. The recess DT5 is located between the projection PT4 and the projection PT5. The recess DT6 is located between the projection PT5 and the projection PT6. The recess DT7 is located between the projection PT6 and the projection PT7. The recess DT8 is located between the projection PT7 and the projection PT8. The recess DT9 is located between the projection PT8 and the projection PT9. The recess DT10 is located between the projection PT9 and the end portion 13E4 of the insulating layer 13. The alignment film AL1 is located in the recesses DT4 to DT6. In addition, the recesses DT4 to DT6 overlap the sealing member SE. In other words, the sealing member SE is disposed over the recesses DT4 to DT6 and overlaps the recesses DT4 to DT6. The alignment film AL1 is not located in the recesses DT7 to DT9. Note that another layer may be located on the insulating layer 12 in the recesses DT4 to DT10. In addition, the alignment film AL1 may be located or may not be located in the recesses DT4 to DT10.

In the example shown in FIG. 13, the light-shielding layer BM extends to the substrate side edge SEG21. Note that the light-shielding layer BM may not extend to the substrate side edge SEG21 if the width of the frame on the mounting portion MT1 side of the display panel PNL is sufficiently large.

Figure 14:
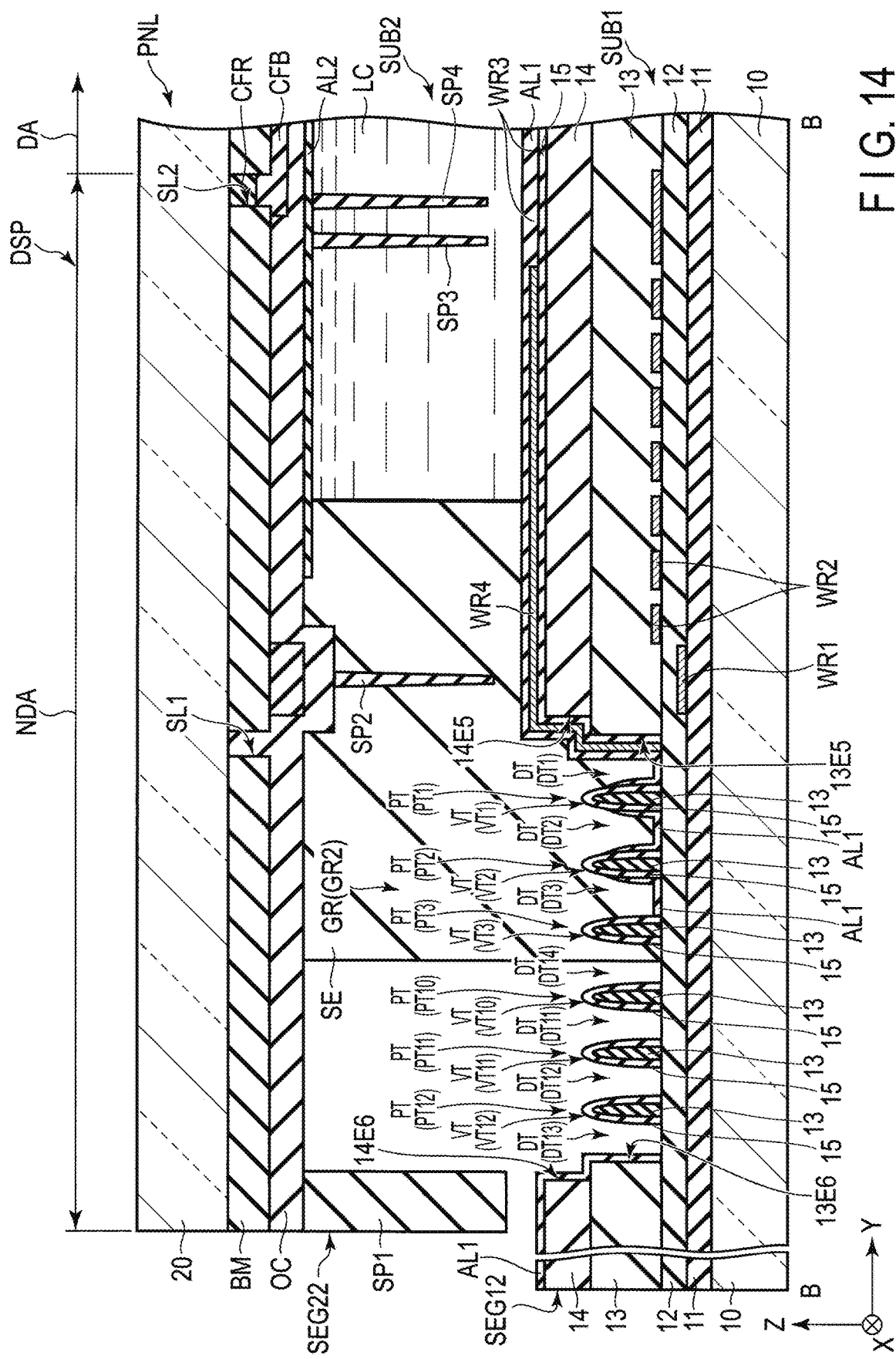
FIG. 14 is a cross-sectional view of the display panel taken along line B-B shown in FIG. 3.

FIG. 14 is a cross-sectional view of the display panel PNL taken along line B-B shown in FIG. 3. FIG. 14 shows the non-display area NDA of the display panel PNL. Only the structures necessary for explanation are illustrated in FIG. 14.

In the example shown in FIG. 14, the groove GR2 penetrates the insulating layers 13 and 14. The groove GR2 is located between an end portion 13E5 of the insulating layer 13 and an end portion 14E5 of the insulating layer 14, and an end portion 13E6 of the insulating layer 13 and an end portion 14E6 of the insulating layer 14. The end portion 13E5 and the end portion 13E6 are separated from each other in the second direction Y. The end portion 13E5 and the end portion 13E6 are opposed to each other in the second direction Y. The end portions 13E5 and 13E6 are closer to the display area DA than they are to the substrate side edge SEG12. The end portion 13E5 is closer to the display area DA than the end portion 13E6 in the second direction Y. The end portion 14E5 and the end portion 14E6 are separated from each other in the second direction Y. The end portion 14E5 and the end portion 14E6 are opposed to each other in the second direction Y. The end portion 14E5 is closer to the display area DA than the end portion 14E6 in the second direction Y. The end portion 14E5 is closer to the display area DA than the end portion 13E5 in the second direction Y. Note that the end portion 14E5 may be located at the same position as the end portion 13E5 or may be closer to the substrate side edge SEG12 than the end portion 13E5 in the second direction Y. The end portion 14E6 is closer to the substrate side edge SEG12 than the end portion 13E6 in the second direction Y. Note that the end portion 14E6 may be located at the same position as the end portion 13E6 or may be closer to the display area DA than the end portion 13E6 in the second direction Y. In other words, the end portion 13E5 and the end portion 13E6 are exposed on the outside of the insulating layer 14 in the groove GR2.

In the example shown in FIG. 14, the peripheral wiring line WR1 is located below the end portion 13E5 of the insulating layer 13. The peripheral wiring line WR4 extends along the insulating layer 15 from above the insulating layer 14 to the side surface side of the end portion 13E5 through the side surface side of the end portion 14E5. The alignment film AL1 extends from above the insulating layer 15 and the peripheral wiring line WR4 to the groove GR2 through the end portion 14E5 side and the end portion 14E6 side.

In the example shown in FIG. 14, the projections PT1 to PT3 and projections PT10 to P12 are arranged in the second direction Y while being spaced apart from each other in the groove GR2. The projections PT1 to PT3 and the projections PT10 to PT12 are located on the insulating layer 12. The projections PT10 to PT12 are exposed on the outside of the alignment film AL1. The top portions VT1 to VT3 overlap the sealing member SE and are bonded to the sealing member SE. The projections PT10 to PT12 do not overlap the sealing member SE. Note that another layer may be located between the projections PT1 to PT3 and the projections PT10 to PT12, and the insulating layer 12. In addition, the projections PT1 to PT3 may be exposed on the outside of the alignment film AL1. The recess DT1 is located between the end portion 13E5 of the insulating layer 13 and the projection PT1. The recess DT14 is located between the projection PT3 and the projection PT10. The recess DT11 is located between the projection PT10 and the projection PT11. The recess DT12 is located between the projection PT11 and the projection PT12. The recess DT13 is located between the projection PT12 and the end portion 13E6 of the insulating layer 13. The alignment film AL1 is located in the recesses DT1 to DT3. The alignment film AL1 is not located in the recess DT14 and the recesses DT11 to DT13. Note that another layer may be located on the insulating layer 12 in the recesses DT1 to DT14 and the recesses DT11 to DT13. In addition, the alignment film AL1 may be located or may not be located in the recesses DT1 to DT14 and the recesses DT11 to DT13.

According to the present embodiment, the display device DSP comprises the first substrate SUB1 having the projection PT in the non-display area NDA, the second substrate SUB2 opposed to the first substrate SUB1, the sealing member SE disposed in the non-display area NDA and bonding the first substrate SUB1 and the second substrate SUB2 together, and the liquid crystal layer LC held between the first substrate SUB1 and the second substrate SUB2. The projection PT projects toward the second substrate SUB2. The cross-sectional shape of the projection PT is, for example, a shape tapered at an acute angle toward the second substrate SUB2. Since the projection PT is formed as described above, even if the alignment film AL1 is applied to the projection PT at the time of manufacturing, at least the top portion VT of the projection PT is exposed on the outside of the alignment film AL1. When the first substrate SUB1 and the second substrate SUB2 are bonded together, the top portion VT is directly bonded to the sealing member SE. Therefore, the display device DSP can form an area which can be bonded with sufficient adhesion strength. The display device DSP can suppress detachment of the display panel PNL due to an impact, etc. Consequently, the reliability of the display device DSP can be improved.

In addition, the display device DSP comprises the wiring line group LG and the recesses DT on the mounting portion MT1 side. The wiring line group LG converges toward the IC chip 2 in the second direction Y. The recesses DT are arranged and spaced apart from each other in the second direction Y. The projection PT is located between each pair of the recesses DT. The recesses DT extend in the first direction X toward the side part LGS of the wiring line group LG. In addition, the recesses DT are separated from the IC chip 2 and are located at different distances from the IC chip 2 in the first direction X. Since the recesses DT are disposed as described above, even if the frame is narrowed and little space is left around the wiring line group LG, the recesses DT and the projections PT can still be formed. Therefore, the display device DSP can increase the area which can be bonded with sufficient adhesion strength.

Next, display devices DSP according to modification examples and another embodiment will be described. In the modification examples and the other embodiment which will be described below, the same portions as those of the first embodiment will be denoted by the same reference numbers and detailed descriptions thereof will be omitted or simplified, and different portions from those of the first embodiment will be mainly described in detail. In the other embodiment also, substantially the same effects as those of the above embodiment can be obtained.

A display device DSP of a modification example 1 of the first embodiment differs from the display device DSP of the first embodiment in that a projection PT is disconnected around a display area DA.

Figure 15:
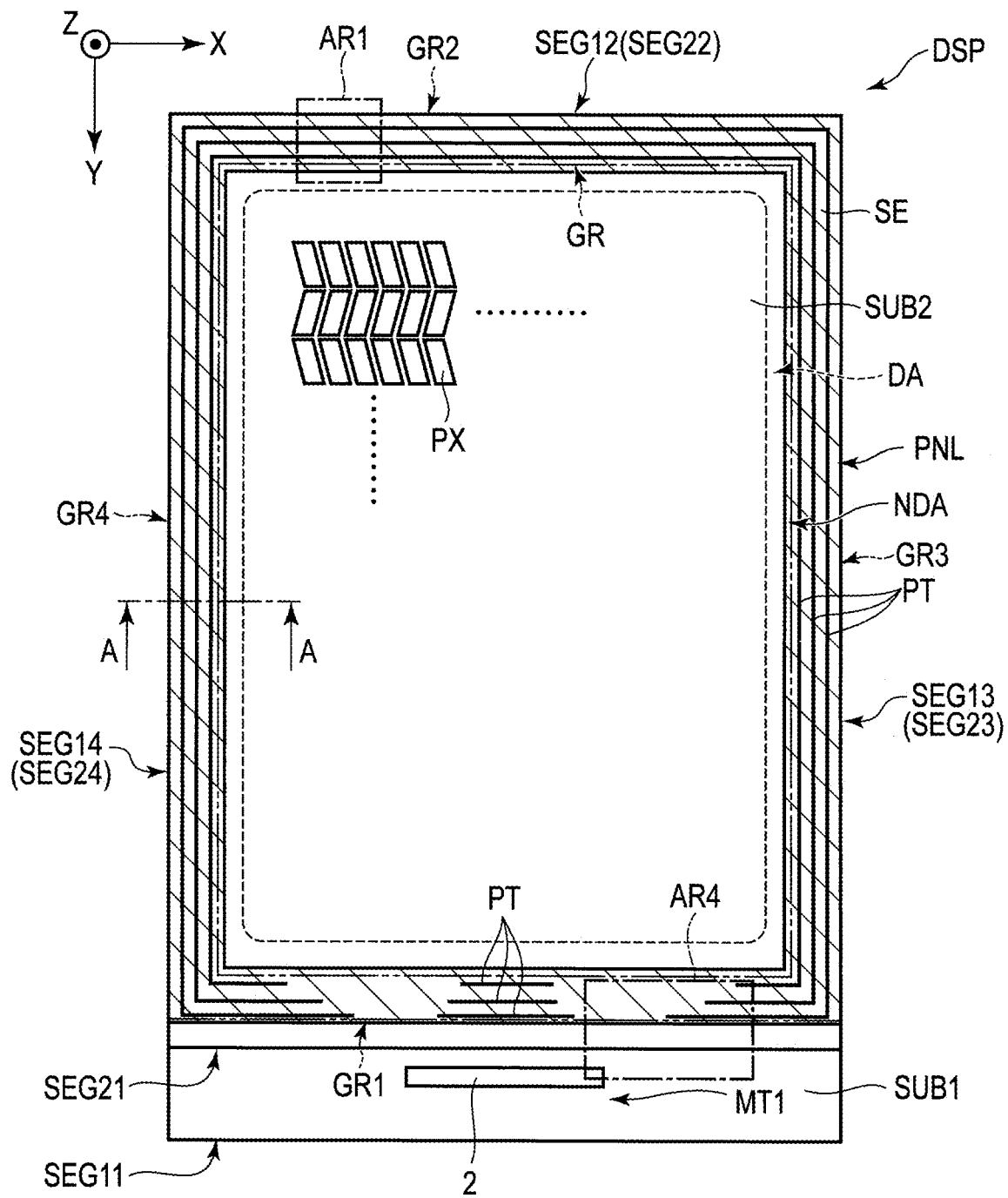
FIG. 15 is a plan view showing an example of the external appearance of a display device of a modification example 1 of the first embodiment.

FIG. 15 is a plan view showing an example of the external appearance of the display device DSP according to the modification example 1 of the first embodiment. Although a display panel PNL having a substantially rectangular shape is taken as an example, the same configuration can also be applied to the display panel PNL having the substantially round shape shown in FIGS. 2 and 3. In the example shown in FIG. 15, all projections PT are disconnected on the mounting portion MT1 side.

Figure 16:
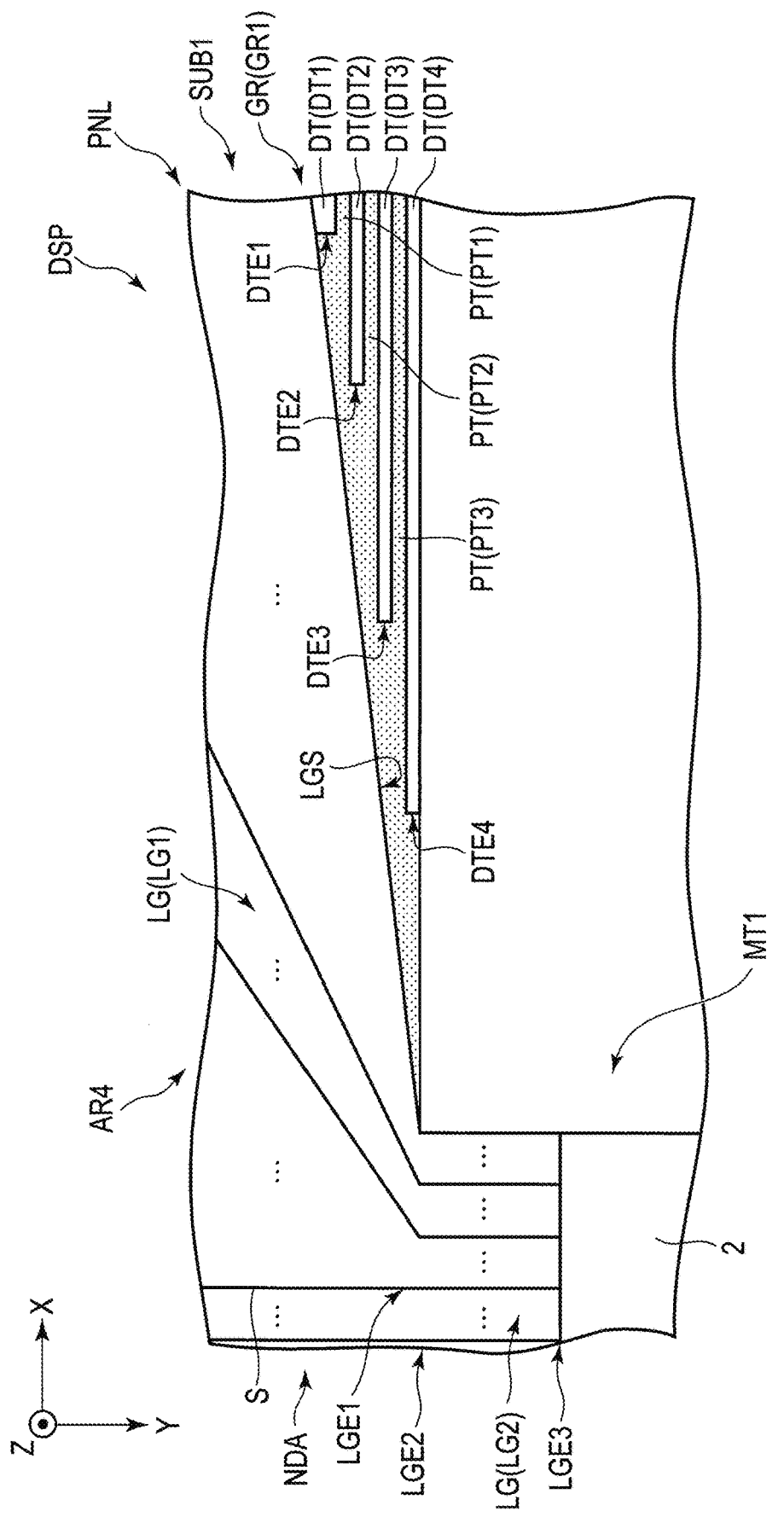
FIG. 16 is a plan view schematically showing a configuration example of a first substrate in an area shown in FIG. 15.

FIG. 16 is a plan view schematically showing a configuration example of the first substrate SUB1 in an area AR4 shown in FIG. 15. Only the structure necessary for explanation are illustrated in FIG. 16.

In the example shown in FIG. 16, an end part LGE1 of a wiring line group LG1 and an end part LGE2 of a wiring line group LG2 are connected to each other.

In the example shown in FIG. 16, projections PT1 to PT3 and recesses DT1 to DT4 are disconnected immediately before a side part LGS of a wiring line group LG in the first direction X. A leading end portion DTE4 of the recess DT4 is separated from the side part LGS in the first direction X. The leading end portion DTE4 is closer to the IC chip 2 than a leading end portion DTE3 in the first direction X. In other words, the leading end portion DTE3 is farther from the IC chip 2 than the leading end portion DTE4 in the first direction X.

In the modification example 1 also, substantially the same effects as those of the first embodiment can be obtained.

A display device DSP of a modification example 2 of the first embodiment differs from the display device DSP of the first embodiment in that the same number of projections PT are disposed over the entire circumference of a display area DA.

Figure 17:
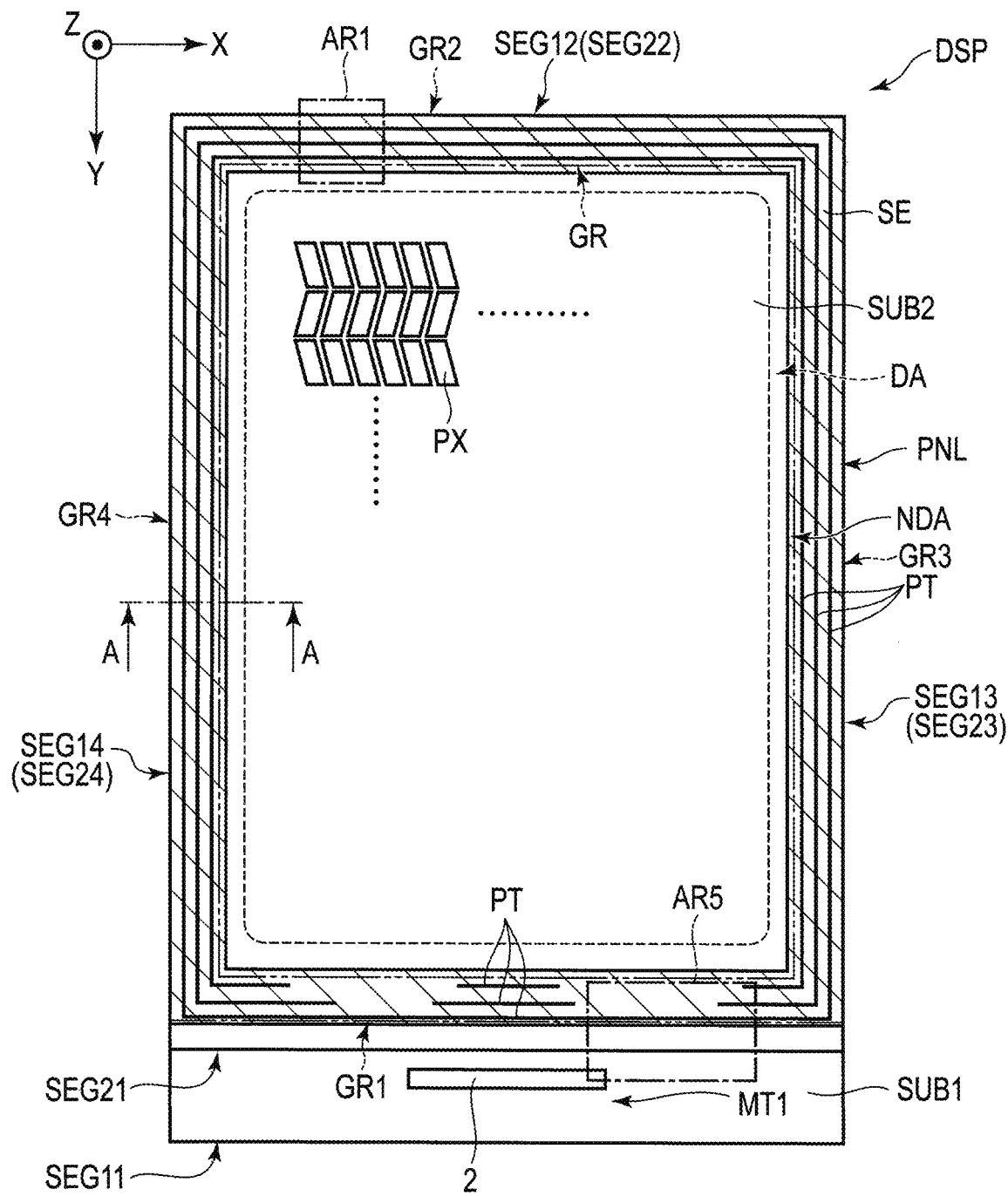
FIG. 17 is a plan view showing an example of the external appearance of a display device of a modification example 2 of the first embodiment.

FIG. 17 is a plan view showing an example of the external appearance of the display device DSP according to the modification example 2 of the first embodiment. Although a display panel PNL having a substantially rectangular shape is taken as an example, the same configuration can also be applied to the display panel PNL having the substantially round shape shown in FIGS. 2 and 3. In the example shown in FIG. 17, some projections PT are disconnected on the mounting portion MT1 side and other projections PT are disposed over the entire circumference of a display area DA.

Figure 18:
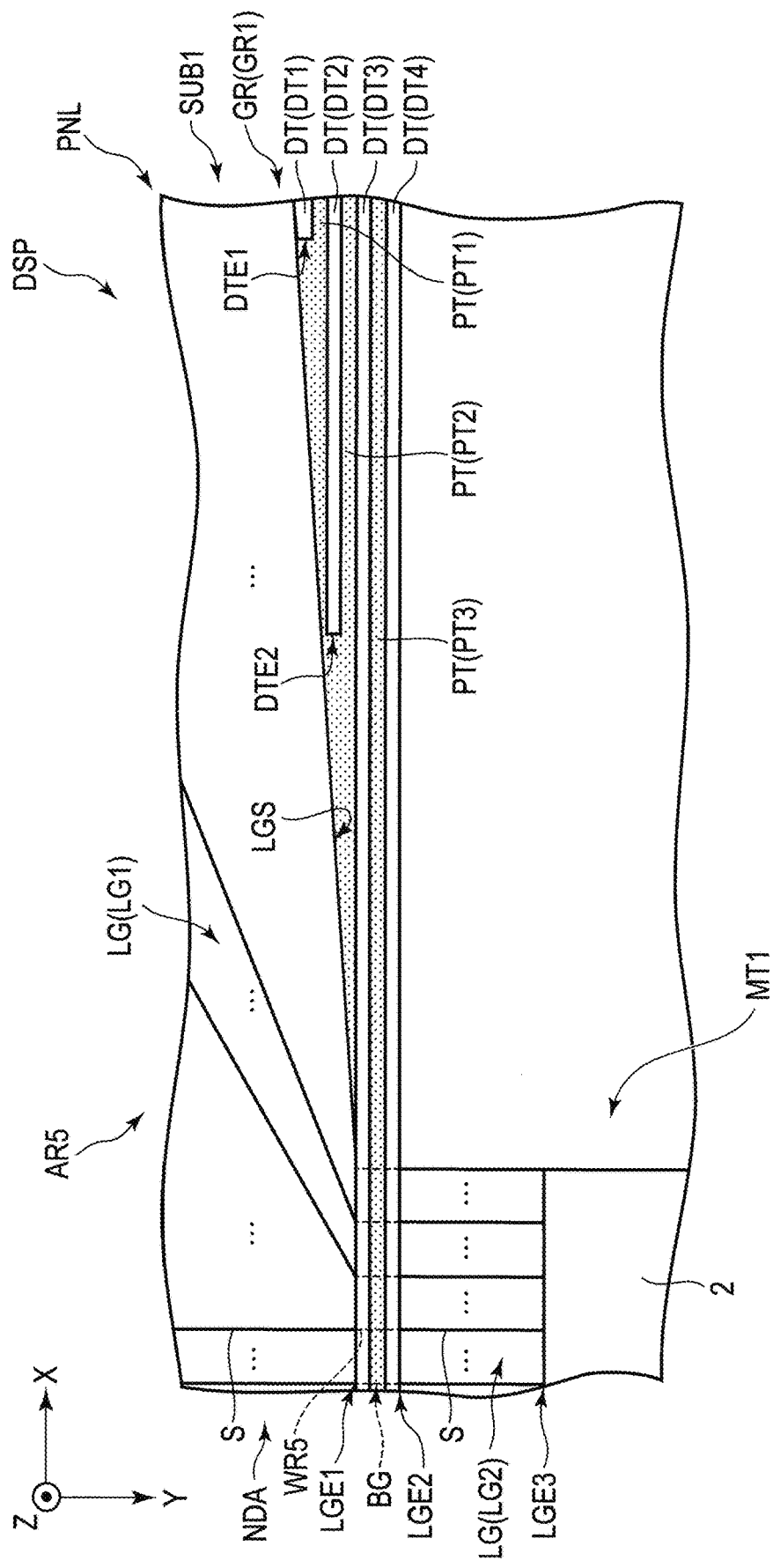
FIG. 18 is a plan view schematically showing a configuration example of a first substrate in an area shown in FIG. 17.

FIG. 18 is a plan view schematically showing a configuration example of the first substrate SUB1 in an area AR5 shown in FIG. 17. Only the structures necessary for explanation are illustrated in FIG. 18.

In the example shown in FIG. 18, a recess DT3 and a recess DT4 overlap a wiring line group BG. In addition, the projection PT overlaps the wiring line group BG.

In the modification example 2 also, substantially the same effects as those of the first embodiment can be obtained.

A display device DSP of a modification example 3 of the first embodiment differs from the display device DSP of the first embodiment in the structure of a part of a display panel PNL.

Figure 19:
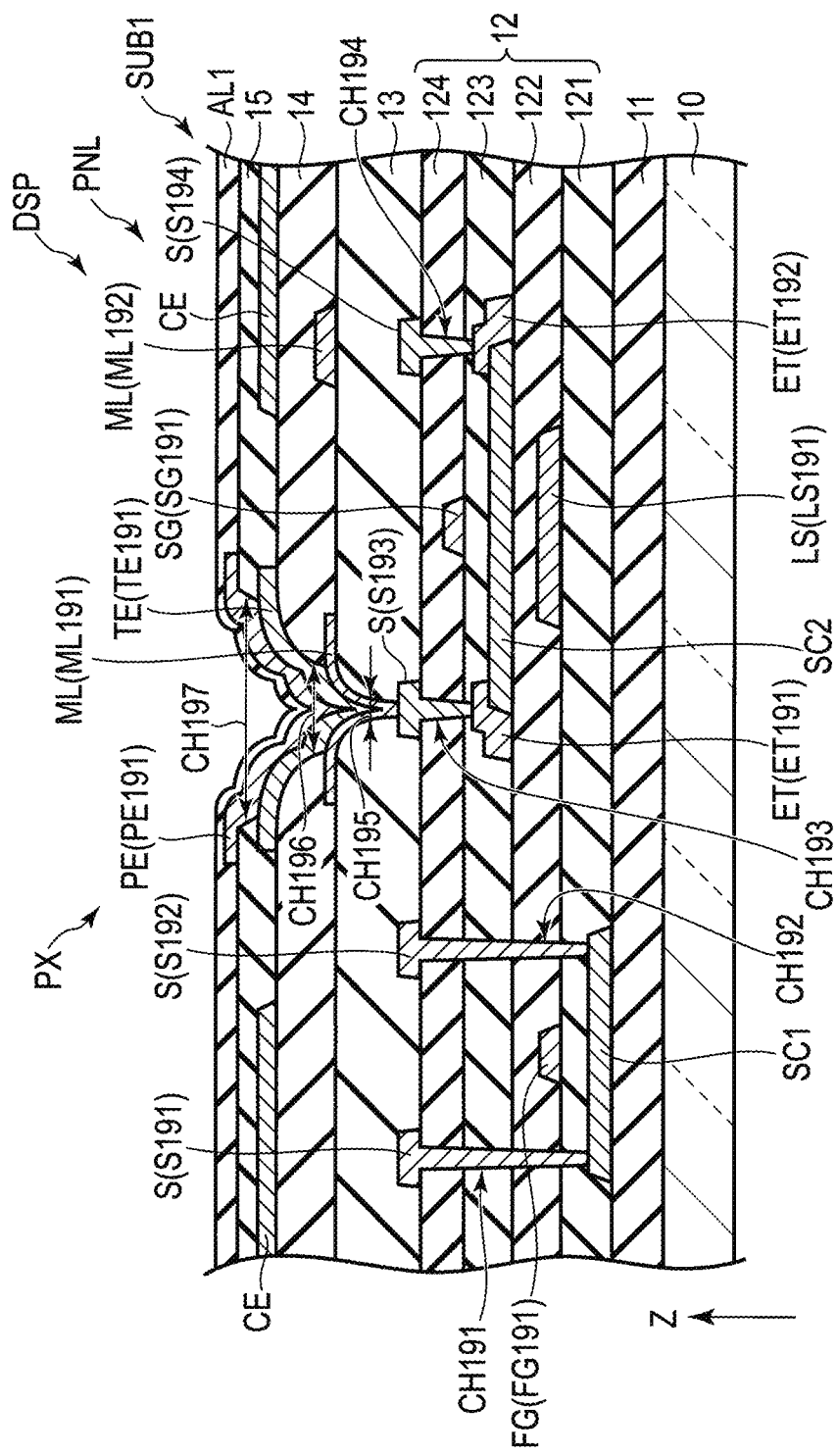
FIG. 19 is a cross-sectional view showing the structure of a part of the first substrate of the display panel shown in FIGS. 1 to 3.

FIG. 19 is a cross-sectional view showing the structure of a part of the first substrate SUB1 of the display panel PNL shown in FIGS. 1 to 3.

The first substrate SUB1 further comprises a semiconductor layer SC1, a scanning line FG (FG191 . . . ), a metal layer LS (LS191 . . . ), a semiconductor layer SC2, an electrode layer ET (ET191, ET192 . . . ), a scanning line SG (SG191 . . . ), a transparent electrode TE (TE191 . . . ) and the like.

The insulating layer 12 includes an insulating layer 121, an insulating layer 122 located on the insulating layer 121, an insulating layer 123 located on the insulating layer 122, and an insulating layer 124 located on the insulating layer 123. The insulating layers 121 to 124 are inorganic insulating layers formed of an inorganic insulating material such as silicon oxide, silicon nitride or silicon oxynitride. The insulating layers 121 to 124 may have a single-layer structure or may have a multilayer structure.

The semiconductor layer SC1 is located between the insulating layer 11 and the insulating layer 121. The semiconductor layer SC1 is, for example, a silicon-based semiconductor. In one example, the semiconductor layer SC1 is formed of polycrystalline silicon. The semiconductor layer SC1 has a high-resistance area whose electric resistance is high and a low-resistance area whose electric resistance is lower than that of the high-resistance area. The scanning line FG is located between the insulating layer 121 and the insulating layer 122. The scanning line FG is opposed to the high-resistance area of the semiconductor layer SC1. The metal layer LS is located between the insulating layer 121 and the insulating layer 122. The metal layer LS is opposed to the semiconductor layer SC2. In the example shown in FIG. 19, the metal layer LS191 is located in the same layer as the scanning line FG191 and is separated from the scanning line FG191. The semiconductor layer SC2 is located between the insulating layer 122 and the insulating layer 123.

A transistor related to this semiconductor layer SC1 exhibits high responsivity and is used as a built-in circuit of the gate drive circuit, etc., for example.

The semiconductor layer SC2 is, for example, a metal oxide-based semiconductor. In one example, the semiconductor layer SC2 is formed of a metal oxide containing at least one of indium, gallium, zinc and tin. The electrode layer ET covers an end portion of the semiconductor layer SC2. The electrode layer ET is formed of, for example, a metal material such as titanium (Ti). In the example shown in FIG. 19, the electrode layer ET191 covers one end portion of the semiconductor layer SC2 and the electrode layer ET192 covers the other end portion of the semiconductor layer SC2 on the opposite side from the one end portion covered with the electrode layer ET191. The scanning line SG is located between the insulating layer 123 and the insulating layer 124. The scanning lines FG and SG and the metal layer LS are formed of the same metal material. For example, the scanning lines FG and SG and the metal layer LS are formed of the same material as the scanning line G. In the example shown in FIG. 19, the scanning line SG191 is opposed to the semiconductor layer SC2.

A transistor related to this semiconductor layer SC2 is used for the sub-pixel PX, for example.

The signal line S is located between the insulating layer 124 and the insulating layer 13. In the example shown in FIG. 19, a signal line S191 is connected to one end portion of the semiconductor layer SC1 via a contact hole CH191 penetrating the insulating layers 121 to 124. A signal line S192 is connected to the other end portion of the semiconductor layer SC1 on the opposite side from the one end portion to which the signal line S191 is connected, via a contact hole CH192 penetrating the insulating layers 121 to 124. A signal line S193 is connected to the electrode layer ET191 via a contact hole CH193 penetrating the insulating layers 124 and 123. A signal line S194 is connected to the electrode layer ET192 via a contact hole CH194 penetrating the insulating layers 124 and 123. In the example shown in FIG. 19, a metal wiring line ML191 is connected to the signal line S193 via a contact hole CH195 penetrating the insulating layer 13. The transparent electrode TE is located in the same layer as the common electrode CE and is formed of the same material as the common electrode CE. In the example shown in FIG. 19, the transparent electrode TE191 is located between the insulating layer 14 and the insulating layer 15. The transparent electrode TE191 is connected to the metal wiring line ML191 via a contact hole CH196 penetrating the insulating layer 14. In the example shown in FIG. 19, a pixel electrode PE191 is connected to the transparent electrode TE191 via a contact hole CH197 penetrating the insulating layer 15.

In the modification example 3 also, substantially the same effects as those of the first embodiment can be obtained.

A display device DSP of a modification example 4 of the first embodiment differs from the display device DSP of the first embodiment in the structure of a part of a display panel PNL.

Figure 20:
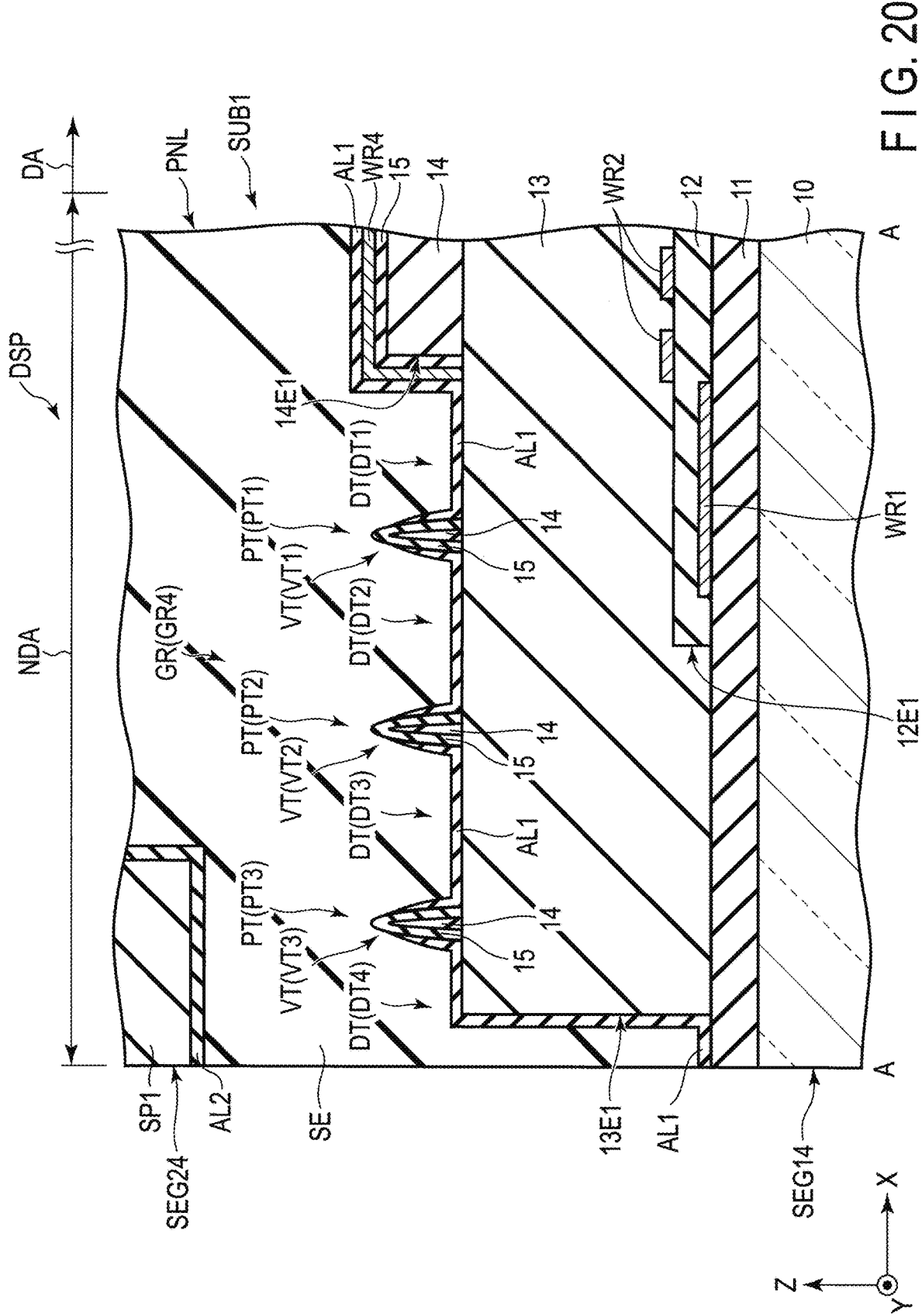
FIG. 20 is a cross-sectional view of a display panel of a modification example 4 taken along line A-A shown in FIGS. 1 to 3.

FIG. 20 is a cross-sectional of the display panel PNL of a modification example 4 taken along line A-A shown in FIGS. 1 to 3. FIG. 20 shows the non-display area NDA of the display panel PNL.

In the example shown in FIG. 20, a groove GR4 penetrates insulating layers 13 and 14 and the like. The groove GR4 is located between an end portion 13E1 of the insulating layer 13 and an end portion 14E1 of the insulating layer 14, and a substrate side edge SEG14. An end portion 12E1 of an insulating layer 12 is closer to the display area DA than the end portion 13E1 in the first direction X and is covered with the insulating layer 13. The end portion 14E1 is closer to the display area DA than the end portion 13E1 in the first direction X. In other words, the end portion 13E1 extends on the outside of the end portion 14E1 in the first direction X.

In the example shown in FIG. 20, an insulating layer 15 extends from above the insulating layer 14 to the side surface of the end portion 14E1. A peripheral wiring line WR4 extends along the insulating layer 15 from above the insulating layer 14 to the side surface side of the end portion 14E1. An alignment film AL1 extends from above the peripheral wiring line WR4 to the groove GR4 through the end portion 14E1 side. In the example shown in FIG. 20, the alignment film AL1 covers from above the peripheral wiring line WR4 to the side surface of the end portion 13E1 through the end portion 13E1 of the insulating layer 13.

A projection PT (PT1, PT2, PT3 . . . ) includes the insulating layer 14 and the insulating layer 15, and is formed of these layers which are stacked in this order. The thickness of the projection PT is, for example, greater than or equal to the thickness of the insulating layer 14. In one example, the thickness of the projection PT is 1.5 μm to 2.0 μm. In the example shown in FIG. 20, the projections PT1 to PT3 are located on the end portion 13E1 of the insulating layer 13. Note that another layer may be located between the projections PT1 to PT3 and the insulating layer 13. The recess DT1 is located between the projection PT1 and the end portion 14E1. Note that another layer may be located on the insulating layer 13 in the recesses DT1 to DT4.

In the modification example 4 also, substantially the same effects as those of the first embodiment can be obtained.

A display device DSP of a modification example 5 of the first embodiment differs from the display device DSP of the first embodiment in the structure of a part of a display panel PNL.

Figure 21:
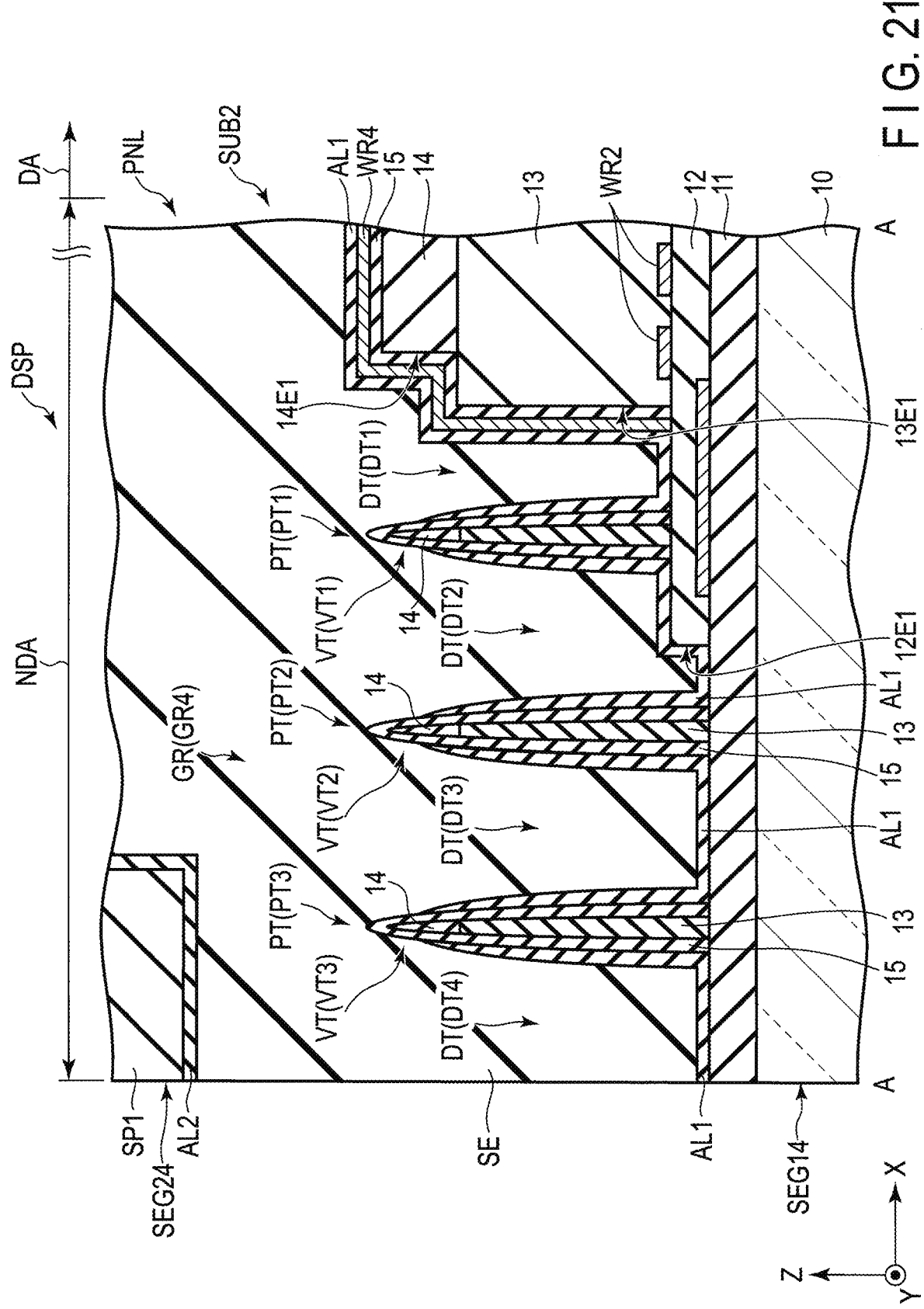
FIG. 21 is a cross-sectional view of a display panel of a modification example 5 taken along line A-A shown in FIGS. 1 to 3.

FIG. 21 is a cross-sectional of a display panel PNL of the modification example 5 taken along line A-A shown in FIGS. 1 to 3. FIG. 21 shows a non-display area NDA of the display panel PNL.

A projection PT (PT1, PT2, PT3 . . . ) includes an insulating layer 13, an insulating layer 14 and an insulating layer 15, and is formed of these layers which are stacked in this order. The thickness of the projection PT is, for example, greater than or equal to the thickness of the insulating layer 13 and the insulating layer 14. In one example, the thickness of the projection PT is 3.5 μm to 5.0 μm.

In the modification example 5 also, substantially the same effects as those of the first embodiment can be obtained.

A display device DSP of a modification example 6 of the first embodiment differs from the display device DSP of the first embodiment in the structure of a part of a display panel PNL.

Figure 22:
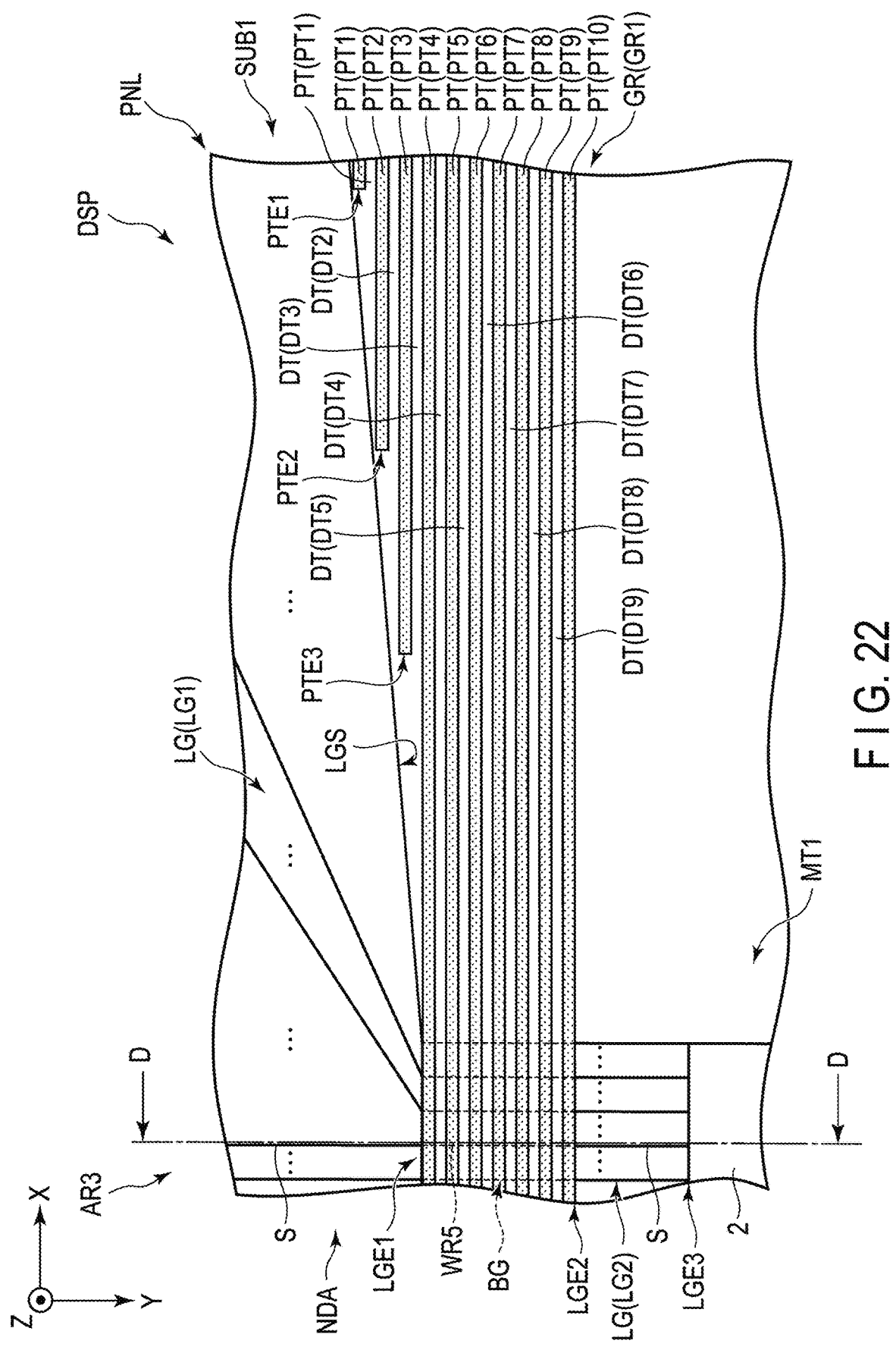
FIG. 22 is a plan view showing an example of the external appearance of a display panel of a modification example 6 of the first embodiment, and a pattern of recesses and projections of an organic insulating film.

FIG. 22 is a plan view schematically showing a configuration example of a first substrate SUB1 of the modification example 6. FIG. 22 corresponds to the configuration example of the first substrate SUB1 in the area AR3 shown in FIG. 11.

In the configuration of a recess DT and a projection PT of the modification example 6, as compared to the configuration of the recess DT and the projection PT shown in FIG. 12, the recess DT and the projection PT are switched around. The recess DT and the projection PT of the modification example 6 are located in the non-display area NDA, for example. In one example, the recess DT and the projection PT of the modification example 6 surround the display area DA of the display panel.

In the example shown in FIG. 22, projections PT1, PT2, PT3, PT4, PT5, PT6, PT7, PT8, PT9 and PT10 extend in the first direction X and are arranged and spaced apart from each other in the second direction Y. The projections PT1 to PT10 do not overlap a wiring line group LG. The projection PT1 extends toward a side part LGS in the first direction X. A leading end portion PTE1 of the projection PT1 is separated from the side part LGS in the first direction X. The projection PT2 extends toward the side part LGS in the first direction X and is separated from the projection PT1 in the second direction Y. A leading end portion PTE2 of the projection PT2 is separated from the side part LGS in the first direction X. The leading end portion PTE2 is closer to the IC chip 2 than the leading end portion PTE1 in the first direction X. In other words, the leading end portion PTE1 is farther from the IC chip 2 than the leading end portion PTE2 in the first direction X. The projection PT3 extends toward the side part LGS and is separated from the projection PT2 in the second direction Y. A leading end portion PTE3 of the projection PT3 is separated from the side part LGS in the first direction X. The leading end portion PTE3 is closer to the IC chip 2 than the leading end portion PTE2 in the first direction X. In other words, the leading end portion PTE2 is farther from the IC chip 2 than the leading end portion PTE3 in the first direction X. The projection PT1 to the projection PT3 are arranged stepwise along the side part LGS. That is, the projections PT1 to PT3 are deviated from each other in the first direction X. The projections PT4 to PT10 overlap a wiring line group BG. The projection PT4 extends in the first direction X and is separated from the projection PT3 in the second direction Y. The projection PT5 extends in the first direction X and is separated from the projection PT4 in the second direction Y. The projection PT6 extends in the first direction X and is separated from the projection PT5 in the second direction Y. The projection PT7 extends in the first direction X and is separated from the projection PT6 in the second direction Y. The projection PT8 extends in the first direction X and is separated from the projection PT7 in the second direction Y. The projection PT9 extends in the first direction X and is separated from the projection PT8 in the second direction Y. The projection PT10 extends in the first direction X and is separated from the projection PT9 in the second direction Y.

In the example shown in FIG. 22, recesses DT (DT1, DT2, DT3, DT4, DT5, DT6, DT7, DT8 and DT9) extend in the first direction X and do not overlap the wiring line group LG. The recess DT1 is located between the projection PT1 and the projection $PT^2$ in the second direction Y. The recess DT2 is located between the projection PT2 and the projection PT3 in the second direction Y. The recess DT3 is located between the projection PT3 and the projection PT4 in the second direction Y. The recess DT4 is located between the projection PT4 and the projection PT5 in the second direction Y. The recess DT5 is located between the projection PT5 and the projection PT6 in the second direction Y. The recess DT6 is located between the projection PT6 and the projection PT7 in the second direction Y. The recess DT7 is located between the projection PT7 and the projection PT8 in the second direction Y. The recess DT8 is located between the projection PT8 and the projection PT9 in the second direction Y. The recess DT9 is located between the projection PT9 and the projection PT10 in the second direction Y. The recesses DT4 to DT9 overlap the wiring line group BG.

In the modification example 6 also, substantially the same effects as those of the first embodiment can be obtained.

A display device DSP of the second embodiment differs from the display device DSP of the first embodiment in the structure of a display panel PNL.

FIG. 23 is a cross-sectional view showing the structure of a part of a display panel PNL of the second embodiment. FIG. 23 is a cross-sectional view showing an example of the structure of an area corresponding to a sub-pixel PX, for example. The example shown in FIG. 23 corresponds to a configuration example employing a display mode using a lateral electric field, for example, a fringe field switching (FFS) mode.

A common electrode CE is located on an insulating layer 13. A metal wiring line ML is in contact with the common electrode CE and overlaps a signal line S. An insulating layer 15 is located on the common electrode CE and the metal wiring line ML. In the example shown in FIG. 23, the insulating layer 15 covers the common electrode CE and the metal wiring line ML.

Figure 24:
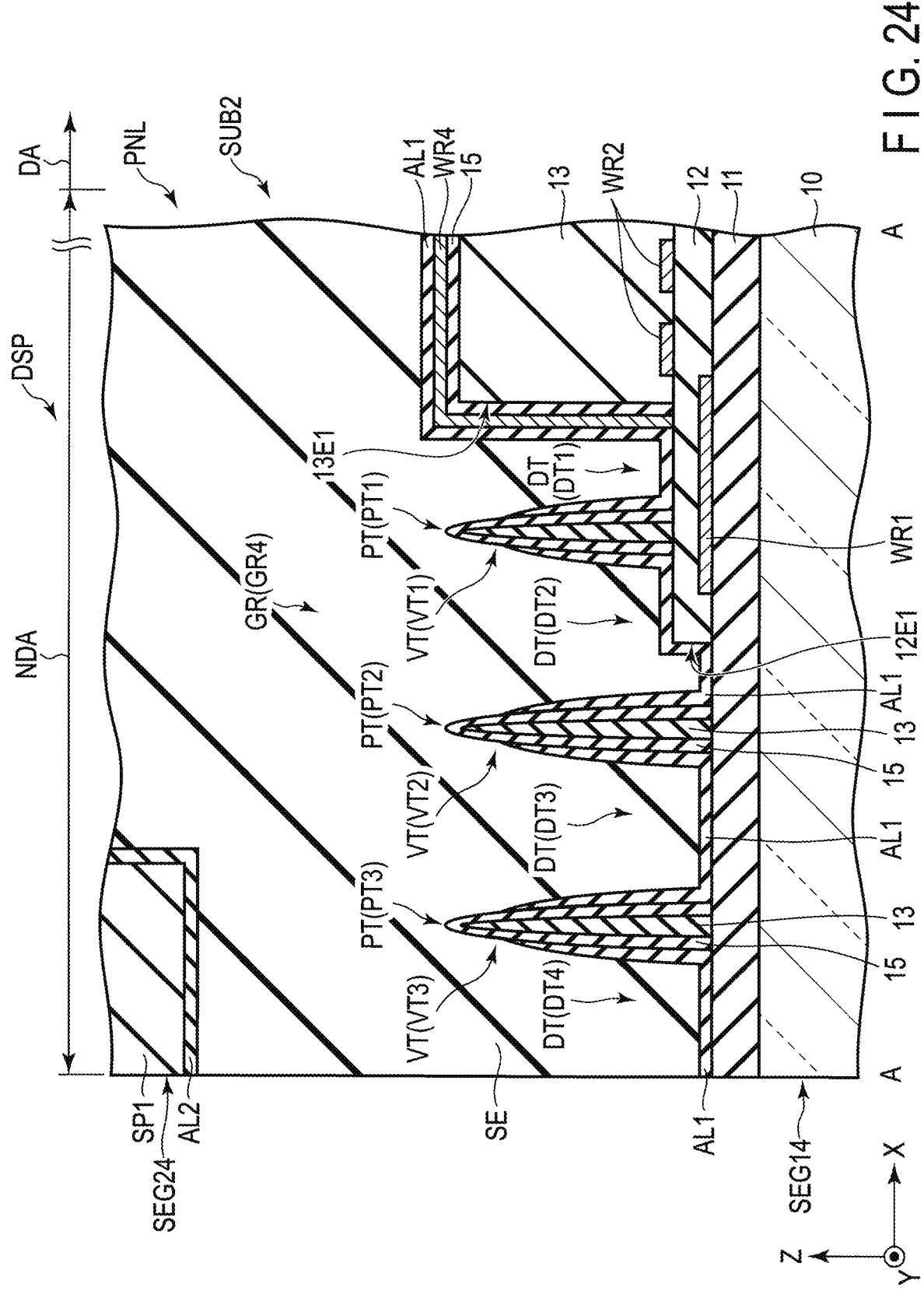
FIG. 24 is a cross-sectional view of the display panel of the second embodiment taken along line A-A shown in FIGS. 1 to 3.

FIG. 24 is a cross-sectional of the display panel PNL of the second embodiment taken along line A-A shown in FIGS. 1 to 3. FIG. 24 shows a non-display area NDA of the display panel PNL.

In the example shown in FIG. 24, a groove GR4 is located between an end portion 13E1 of the insulating layer 13 and a substrate side edge SEG14. The insulating layer 15 extends from above the insulating layer 13 to the side surface of the end portion 13E1. A peripheral wiring line WR4 extends along the insulating layer 15 from above the insulating layer 13 to the side surface side of the end portion 13E1. An alignment film AL extends from above the peripheral wiring line WR4 to the groove GR4 through the end portion 13E1 side.

In the second embodiment also, substantially the same effects as those of the first embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate including an organic film;
a plurality of pixels in a display area;
a first projection and a second projection; and
a second substrate opposed to the first substrate, wherein, in planar view,
the second substrate has a round shape in a part of a substrate side edge,
a groove of the organic film is formed along the round shape,
the groove of the organic film is located outside of the display area,
the first projection and the second projection are located inside of the groove of the organic film, and overlap the second substrate,
the first projection is formed along the round shape,
the second projection is formed along the round shape,
the first projection is between the second projection and the display area,
a length of the first projection along the substrate side edge is different from a length of the second projection along the substrate side edge,
the length of the first projection is shorter than the length of the second projection,
the first substrate and the second substrate are bonded by a sealing member,
the groove of the organic film, the first projection, and the second projection overlap the sealing member,
the round shape is a notch of the second substrate,
the groove of the organic film is formed along the notch of the second substrate,
the first projection is formed along the notch of the second substrate, and
the second projection is formed along the notch of the second substrate.

2. The display device of claim 1, wherein
the first substrate further includes an alignment film,
the alignment film is in contact with the sealing member in an area between the first projection and the second projection,
a top portion of the first projection is exposed on an outside of the alignment film, and is in contact with the sealing member, and
a top portion of the second projection is exposed on an outside of the alignment film, and is in contact with the sealing member.

3. The display device of claim 2, wherein
the first projection and the second projection are laminated structures of an organic material and an inorganic material,
the inorganic material covers the organic material, and
the sealing member is in contact with the inorganic material of the laminated structures.

4. The display device of claim 1, wherein
a thickness of the first projection is 2.0 µm to 3.0 µm, and a width of the first projection is 7.0 µm.

5. The display device of claim 1, wherein
the first substrate further includes a plurality of touch sensor electrodes arranged in a matrix in the display area, in planar view, and
the plurality of touch sensor electrodes are between the organic film and the second substrate, in a cross-sectional view.

6. A display device comprising:
a first substrate including an organic film;
a plurality of pixels in a display area;
a first projection and a second projection; and
a second substrate opposed to the first substrate, wherein, in planar view,
the second substrate has a round shape in a part of a substrate side edge, a groove of the organic film is formed along the round shape,
the groove of the organic film is located outside of the display area,
the first projection and the second projection are located inside of the groove of the organic film, and overlap the second substrate,
the first projection is formed along the round shape,
the second projection is formed along the round shape,
the first projection is between the second projection and the display area,
a length of the first projection along the substrate side edge is different from a length of the second projection along the substrate side edge,
the length of the first projection is shorter than the length of the second projection,
the first substrate and the second substrate are bonded by a sealing member,
the groove of the organic film, the first projection, and the second projection overlap the sealing member,
the first substrate further includes a plurality of signal lines arrayed in a first direction in the display area, and a plurality of scanning lines arrayed in a second direction intersecting the first direction,
the first projection has a first leading end and a second leading end opposed to the first leading end in the first direction,
the second projection has a third leading end and a fourth leading end opposed to the third leading end in the first direction, and
the third leading end and the fourth leading end are located between the first leading end and the second leading end in the first direction, in planar view.

7. A substrate comprising:
an organic film;
a plurality of pixels in a display area;
a first projection and a second projection;
a counter substrate opposed to the substrate; and
a sealing member bonding to the substrate and the counter substrate, wherein, in planar view,
the display area has a round shape in a part of a border between the display area and a peripheral area outside of the display area,
a groove of the organic film is formed along the round shape,
the groove of the organic film is located in the peripheral area,
the first projection and the second projection are located inside of the groove of the organic film,
the first projection is formed along the round shape,
the second projection is formed along the round shape,
the first projection is between the second projection and the display area,
a length of the first projection along the border is different from a length of the second projection along the border,
the length of the first projection is shorter than the length of the second projection,
the groove of organic film the first projection, and the second projection overlap the sealing member,
the round shape is a notch,
the groove of the organic film is formed along the notch,
the first projection is formed along the notch, and
the second projection is formed along the notch.

8. The display device of claim 7, wherein
the substrate further includes an alignment film,
the alignment film is in contact with the sealing member in an area between the first projection and the second projection,
a top portion of the first projection is exposed on an outside of the alignment film, and is in contact with the sealing member, and
a top portion of the second projection is exposed on an outside of the alignment film, and is in contact with the sealing member.

9. The substrate of claim 7, wherein
a thickness of the first projection is 2.0 μm to 3.0 μm, and a width of the first projection is 7.0 μm.

10. The substrate of claim 7, further comprising:
a plurality of touch sensor electrodes arranged in a matrix in the display area; and
an inorganic film covering the plurality of sensor electrodes, wherein,
in planar view, the plurality of touch sensor electrodes are between the organic film and the inorganic film, in a cross-sectional view.

11. The substrate of claim 7, further comprising:
a plurality of signal lines arrayed in a first direction in the display area; and
a plurality of scanning lines arrayed in a second direction intersecting the first direction, wherein
the first projection has a first leading end and a second leading end opposed to the first leading end in the first direction,
the second projection has a third leading end and a fourth leading end opposed to the third leading end in the first direction, and
the third leading end and the fourth leading end are located between the first leading end and the second leading end in the first direction, in planar view.

* * * * *